(12) United States Patent
Yun et al.

(10) Patent No.: US 11,275,034 B2
(45) Date of Patent: Mar. 15, 2022

(54) INSPECTION APPARATUS AND METHOD BASED ON COHERENT DIFFRACTION IMAGING (CDI)

(71) Applicant: SAMSUNG ELECTRONICS CO., LTD., Suwon-si (KR)

(72) Inventors: Kyungwon Yun, Hwaseong-si (KR); Taewan Kim, Yongin-si (KR); Seungbeom Park, Gwangju (KR); Jaehyeon Son, Hwaseong-si (KR); Myungjun Lee, Seongnam-si (KR); Jaehwang Jung, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/022,249

(22) Filed: Sep. 16, 2020

(65) Prior Publication Data
US 2021/0164919 A1 Jun. 3, 2021

(30) Foreign Application Priority Data
Dec. 2, 2019 (KR) .......... 10-2019-0158452

(51) Int. Cl.
*G01N 21/956* (2006.01)
*G01N 21/45* (2006.01)

(52) U.S. Cl.
CPC ......... *G01N 21/956* (2013.01); *G01N 21/453* (2013.01); *G01N 2021/95676* (2013.01); *G01N 2201/061* (2013.01)

(58) Field of Classification Search
CPC .. G03F 7/70625; G03F 7/705; G03F 7/70666; G03F 1/84; G03F 1/24;
(Continued)

(56) References Cited

U.S. PATENT DOCUMENTS 8,335,039 B2   12/2012   Lee et al.
8,623,588 B2   1/2014    Sewell
(Continued)

FOREIGN PATENT DOCUMENTS

KR   10-1807396 B1   12/2017
WO   2013/070287 A1   5/2013

OTHER PUBLICATIONS

Greenbaum et al., "Maskless imaging of dense samples using pixel super-resolution based multi-height lensfree on-chip microscopy", Optics Express, vol. 20, No. 3, DOI: 10.1364/OE.20.003129, Jan. 2012, pp. 3129-3143, 16 pages total.
(Continued)

*Primary Examiner* — Shawn Decenzo
*Assistant Examiner* — Jarreas C Underwood
(74) *Attorney, Agent, or Firm* — Sughrue Mion, PLLC

(57) ABSTRACT

An inspection apparatus includes: a light source that generates and outputs light; a stage on which an inspection target is arranged; an irradiation optical system that irradiates light from the light source to the inspection target; a detector that receives the light diffracted from the inspection target and generates diffraction image; and a detector moving device configured to move the detector on a z-axis, which is an optical axis of the light, and an x-y plane perpendicular to the z-axis. Furthermore, while the detector moves on the x-y plane and the z-axis through the detector moving device, the detector generates a plurality of the diffraction images with different positions on the x-y plane and the z-axis with respect to the inspection target, and thus simultaneously implements phase retrieval and super resolution of diffraction images.

18 Claims, 16 Drawing Sheets

(58) Field of Classification Search
CPC ............. G01N 21/956; G01N 21/4788; G01N 21/8806; G01N 2021/95676
See application file for complete search history.

(56) References Cited

U.S. PATENT DOCUMENTS

| | | | |
|---|---|---|---|
| 8,902,430 B2 | 12/2014 | Yamaguchi et al. | |
| 9,213,313 B2* | 12/2015 | Schnell | G03H 1/08 |
| 9,915,621 B2 | 3/2018 | Foad et al. | |
| 9,952,422 B2 | 4/2018 | Vaziri et al. | |
| 10,042,270 B2 | 8/2018 | Ekinci et al. | |
| 10,146,140 B2 | 12/2018 | Pisarenco et al. | |
| 10,180,316 B2 | 1/2019 | Brodmann et al. | |
| 10,288,489 B2 | 5/2019 | Otaki et al. | |
| 10,346,964 B2 | 7/2019 | Ebstein | |
| 11,092,795 B2* | 8/2021 | Chung | G01N 21/6458 |
| 2014/0300696 A1* | 10/2014 | Ozcan | G03H 1/0005 348/40 |
| 2015/0362713 A1* | 12/2015 | Betzig | G02B 21/0076 250/459.1 |
| 2016/0154301 A1 | 6/2016 | Ekinci | |
| 2017/0168285 A1* | 6/2017 | Ozcan | G03H 1/0443 |
| 2017/0220000 A1* | 8/2017 | Ozcan | G03H 1/0005 |
| 2018/0033128 A1* | 2/2018 | Sobieranski | H04N 5/23232 |
| 2018/0188192 A1 | 7/2018 | Artemiev et al. | |
| 2019/0369557 A1 | 12/2019 | Lee et al. | |
| 2020/0064276 A1 | 2/2020 | Lee et al. | |
| 2021/0080743 A1* | 3/2021 | Lee | G02B 21/0008 |
| 2021/0200148 A1* | 7/2021 | Park | G03H 1/16 |

OTHER PUBLICATIONS

Zhang et al., "Adaptive pixel-super-resolved lensfree in-line digital holography for wide-field on-chip microscopy", Scientific Reports, 7: 11777, DOI:10.1038/s41598-017-11715-x, Sep. 18, 2017, pp. 1-15, 15 pages total.

* cited by examiner

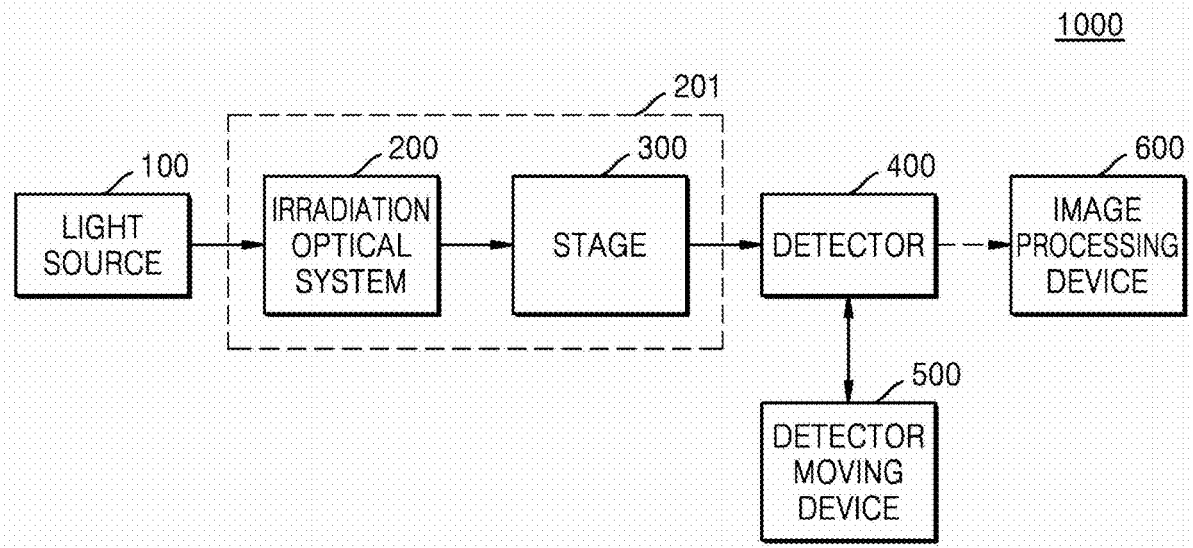
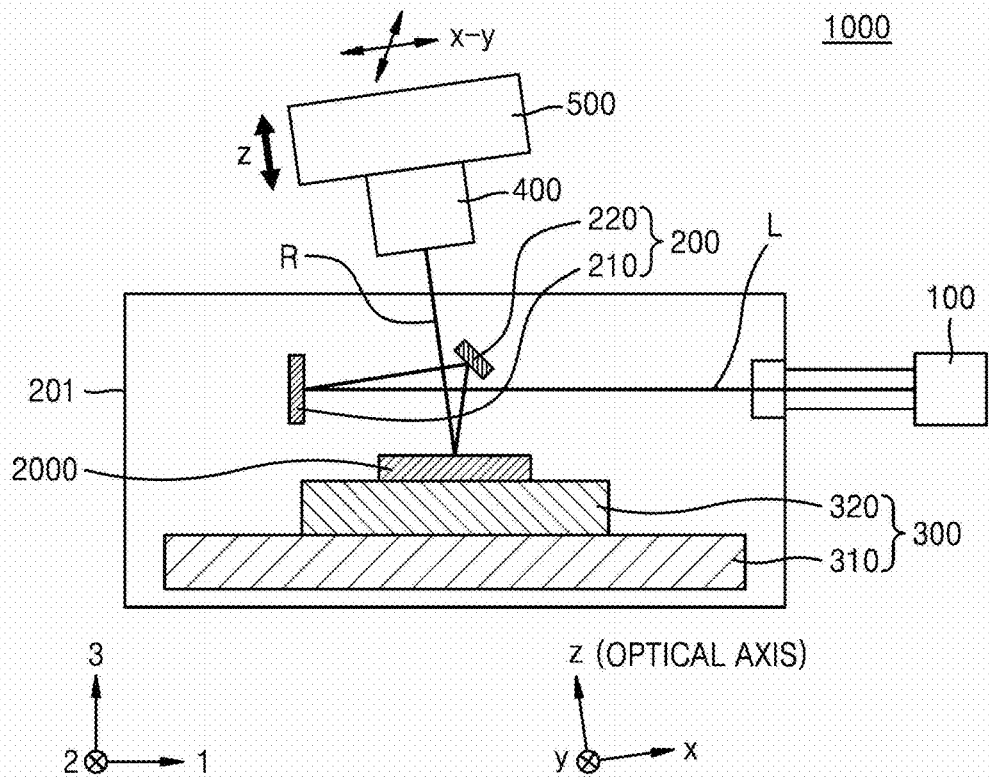

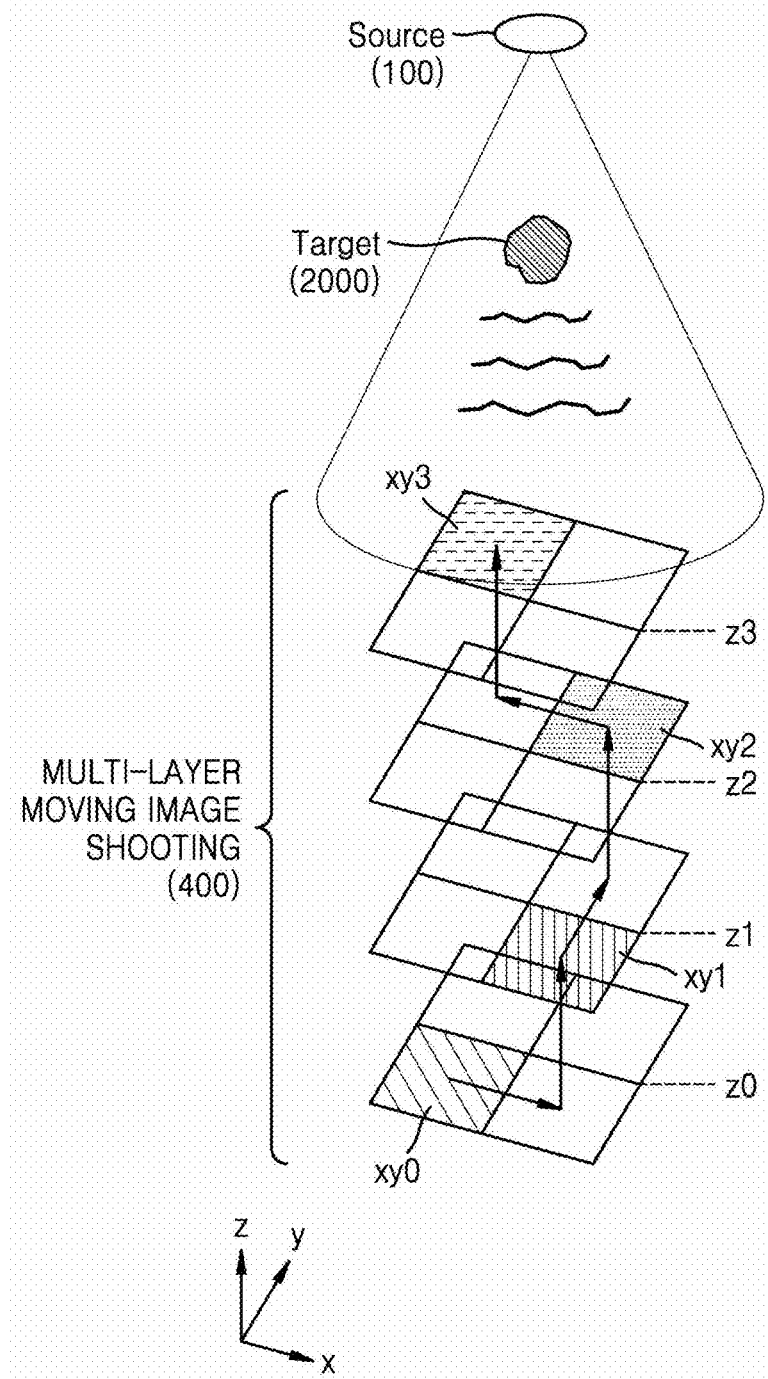

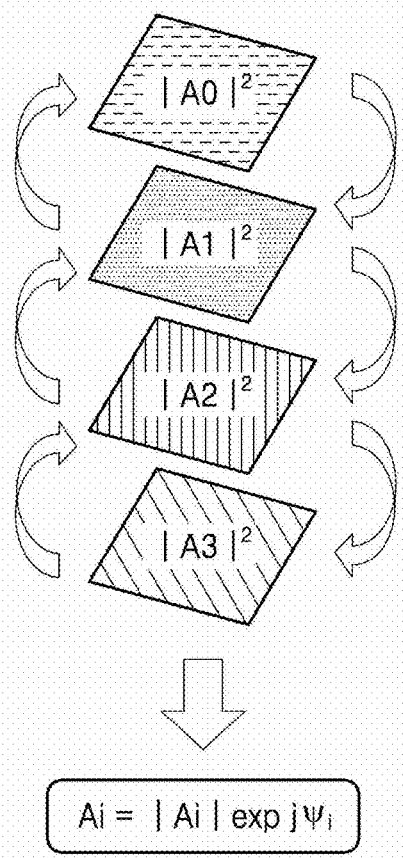

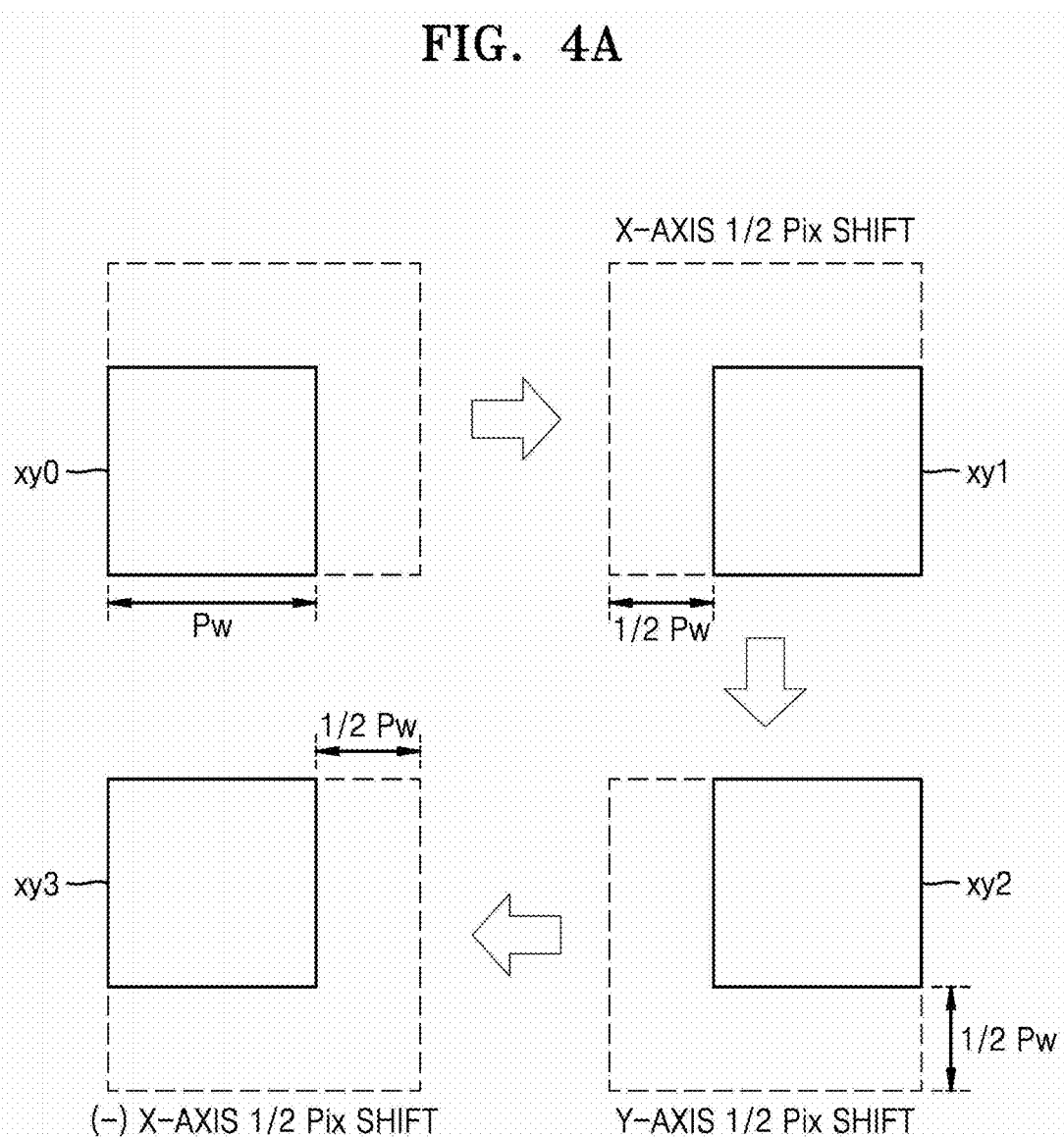

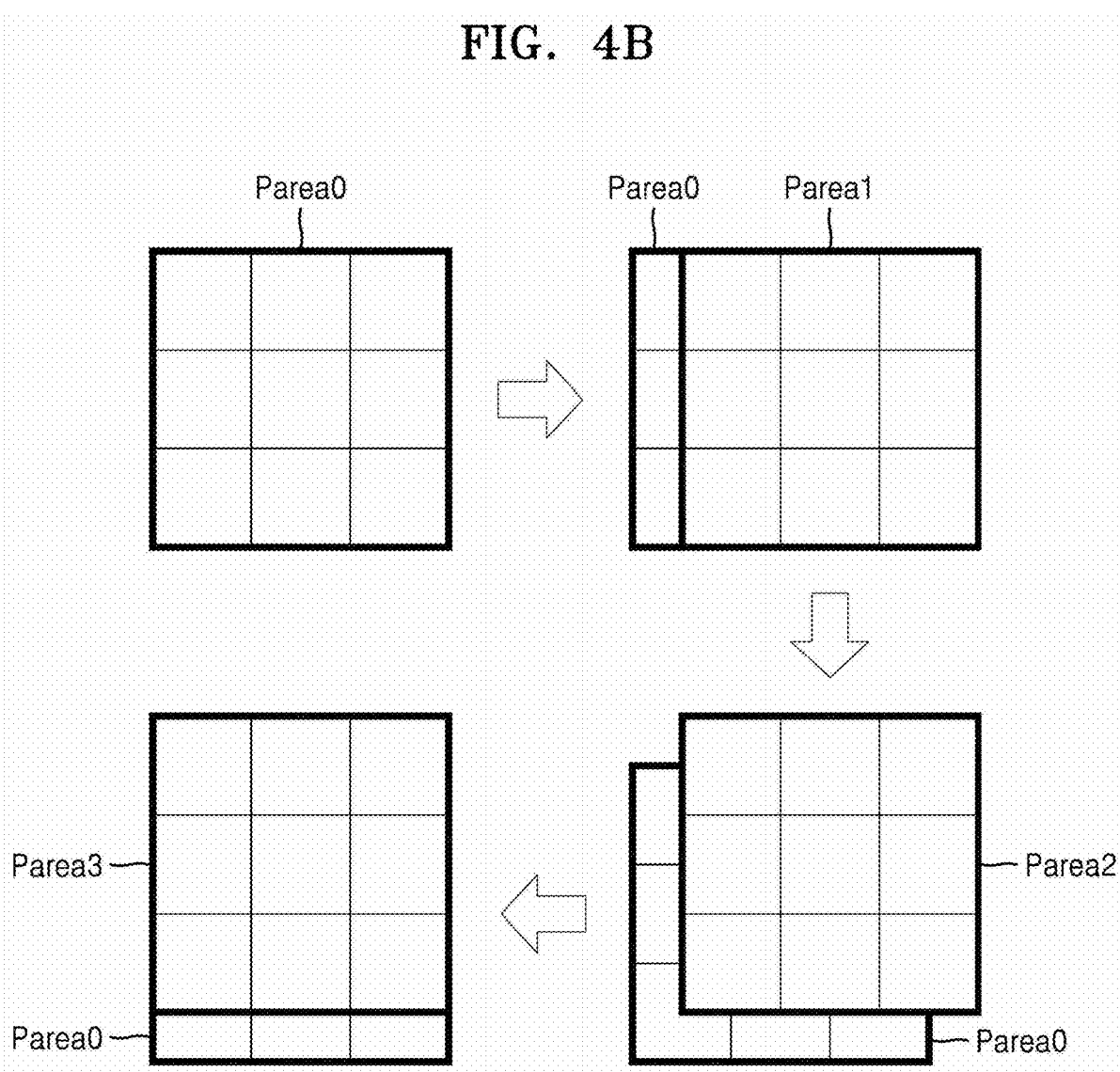

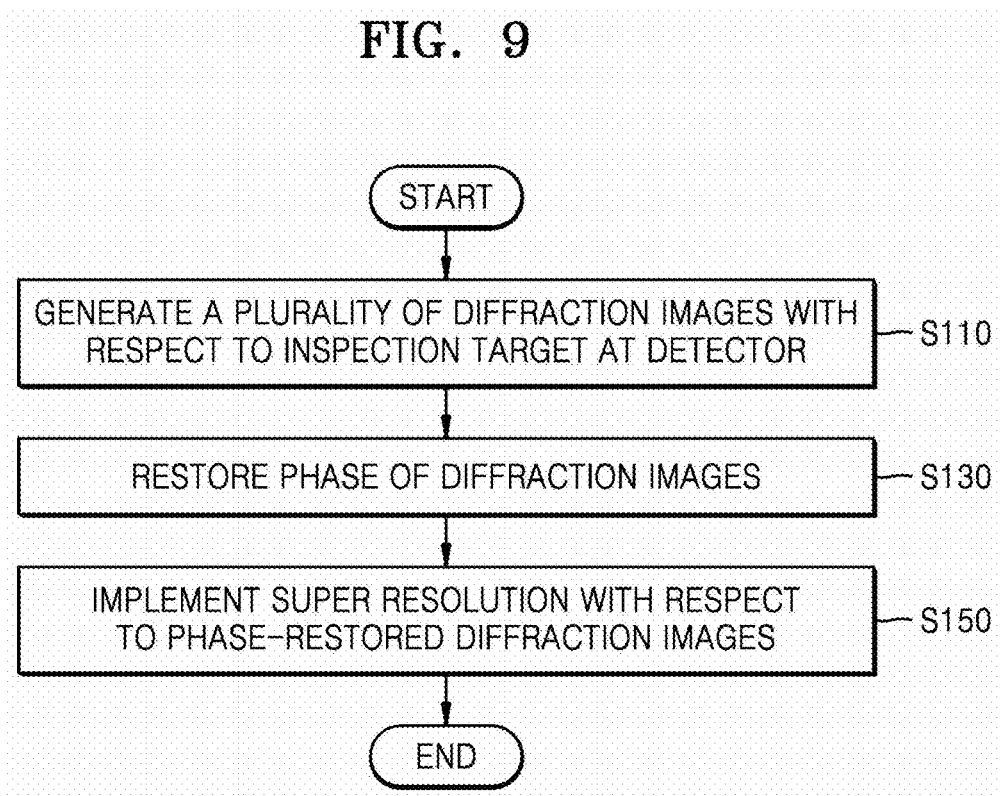

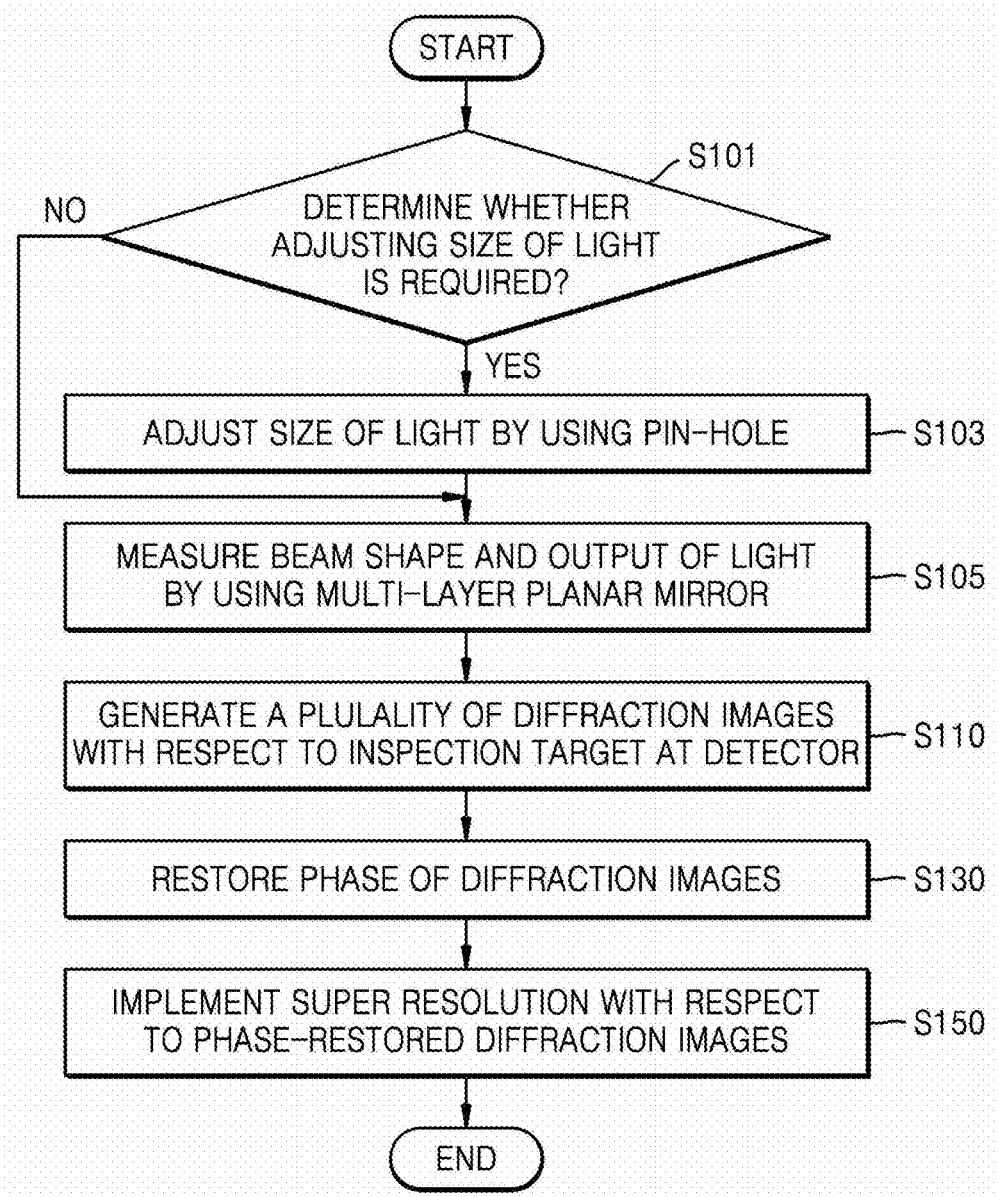

INSPECTION APPARATUS AND METHOD BASED ON COHERENT DIFFRACTION IMAGING (CDI)

CROSS-REFERENCE TO RELATED APPLICATION

This application is based on and claims priority from Korean Patent Application No. 10-2019-0158452, filed on Dec. 2, 2019, in the Korean Intellectual Property Office, the disclosure of which is incorporated herein in its entirety by reference.

BACKGROUND

1. Field

The inventive concept relates to an inspection apparatus and an inspection method, and more particularly, to an inspection apparatus and an inspection method based on coherent diffraction imaging (CDI).

2. Description of Related Art

An electron microscope, an ellipsometry, or the like may be used to evaluate a pattern on an inspection target, for example, an extreme ultraviolet (EUV) mask, or to inspect the presence of a defect thereon. The electron microscope is an apparatus for making an enlarged image of an object by using electron beam and an electron lens. The electron microscope may overcome the resolution limitation of an existing optical microscope and thus may have an advantage of allowing fine observation. On the other hand, the ellipsometry is a technique of obtaining information with respect to a sample by analyzing the polarization change of light to be reflected from the sample (for example, a surface of the EUV mask). For example, when the light is reflected on the sample, the polarization state of the reflected light may vary according to the optical properties of sample material and a thickness of sample layer. Thus, the ellipsometry may obtain physical information with respect to the sample by measuring the polarization change of such reflected light.

SUMMARY

The inventive concept provides an inspection apparatus and an inspection method capable of reducing shooting (or capturing) time in terms of hardware and reducing image processing time in terms of software.

According to an aspect of the disclosure, there is provided an inspection apparatus comprising: a light source configured to output light; a stage on which an inspection target is arranged; an irradiation optical system configured to irradiate the light from the light source on to the inspection target; a detector configured to receive the light diffracted from the inspection target and generate a plurality of diffraction images; and a detector moving device configured to move the detector on a z-axis and along an x-y plane perpendicular to the z-axis, wherein the z-axis is an optical axis of the light diffracted from the inspection target, wherein while the detector moves on the x-y plane and the z-axis based on the detector moving device, the detector generates the plurality of the diffraction images corresponding to different positions on the x-y plane and the z-axis with respect to the inspection target, and simultaneously performs phase retrieval and super resolution operation on the plurality of diffraction images.

According to another aspect of the disclosure, there is provided an inspection apparatus comprising: an extreme ultraviolet (EUV) light source configured to generate and output EUV; a stage on which an EUV mask is arranged; an irradiation optical system configured to irradiate the EUV from the EUV light source on to the EUV mask, wherein the EUV is focused on to the EUV mask by using a multi-layer concave mirror; a detector configured to generate a plurality of the diffraction images by receiving the EUV reflected and diffracted from the EUV mask, wherein the plurality of diffraction images are generated with different positions on an x-y plane and on a z-axis with respect to the EUV mask through movement on the z-axis corresponding to an optical axis of the EUV and through movement on an x-y plane perpendicular to the z-axis; and an image processing device configured to perform image processing to simultaneously implement phase retrieval and super resolution of the diffraction image based on the plurality of the diffraction images.

According to another aspect of the disclosure, there is provided an inspection method comprising: generating a plurality of diffraction images by irradiating light from a light source to an inspection target through an irradiation optical system and receiving the diffracted light from the inspection target by a detector; implementing phase retrieval to restore phase of the diffraction images based on the plurality of the diffraction images; and implementing super resolution with respect to the plurality of the diffraction images in which the phase is restored, wherein the generating the plurality of the diffraction image comprises, while the detector moves on a z-axis corresponding to an optical axis of the light and an x-y plane perpendicular to the z-axis, the detector generates the plurality of diffraction images with different positions on the x-y plane and the z-axis with respect to the inspection target, and wherein the phase retrieval and the super resolution of diffraction images are implemented simultaneously.

According to another aspect of the disclosure, there is provided an apparatus comprising: a memory storing one or more instructions; and a processor configured to execute the one or more instructions to: generate a plurality of diffraction images based on diffracted light from an inspection target, wherein each of the plurality of the diffraction image corresponds to the diffracted light at different positions on a x-y plane and a z-axis corresponding to an optical axis with respect to the inspection target; perform phase retrieval operation to restore phase of the plurality of diffraction images based on the plurality of the diffraction images; and perform super resolution operation with respect to the plurality of the diffraction images based on the restored phase, wherein the phase retrieval operation and the super resolution operation of diffraction images are performed simultaneously.

BRIEF DESCRIPTION OF THE DRAWINGS

Embodiments of the inventive concept will be more clearly understood from the following detailed description taken in conjunction with the accompanying drawings in which:

FIG. 1A is a block diagram of a CDI based inspection apparatus according to an example embodiment of the inventive concept; and FIG. 1B is a conceptual diagram of a CDI based inspection apparatus according to an example embodiment of the inventive concept;

FIGS. 3A to 3C are conceptual diagrams schematically illustrating a process of simultaneously implementing phase retrieval and super resolution of a diffraction image through the inspection apparatus of FIG. 1A or 1B;

FIGS. 4A and 4B are conceptual diagrams for describing the concept of moving a detector on an x-y plane to implement super resolution;

FIG. 9 is a flowchart schematically illustrating a CDI based inspection method according to an embodiment of the inventive concept;

FIG. 11 is a flowchart schematically illustrating a CDI based inspection method according to an embodiment of the inventive concept.

DETAILED DESCRIPTION OF THE EMBODIMENTS

Figure 2A:
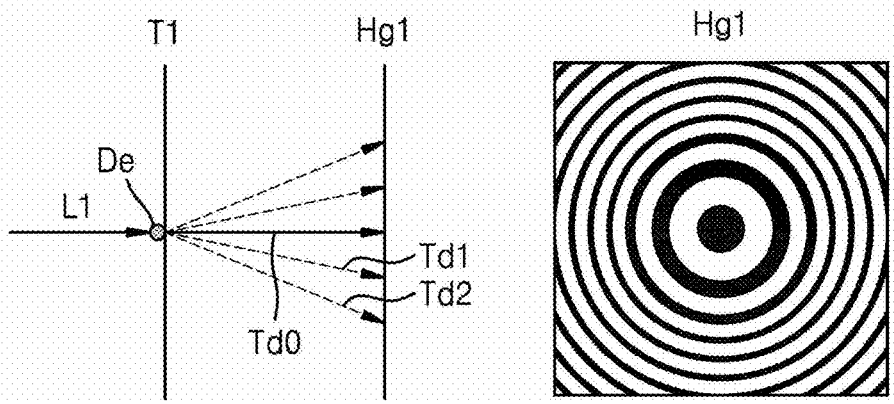
FIGS. 2A and 2B are conceptual diagrams for describing concept of CDI.

Hereinafter, example embodiments of the inventive concept will be described with reference to the accompanying drawings. Like reference numerals refer to like elements throughout the drawings, and redundant descriptions thereof will be omitted.

Figure 2B:
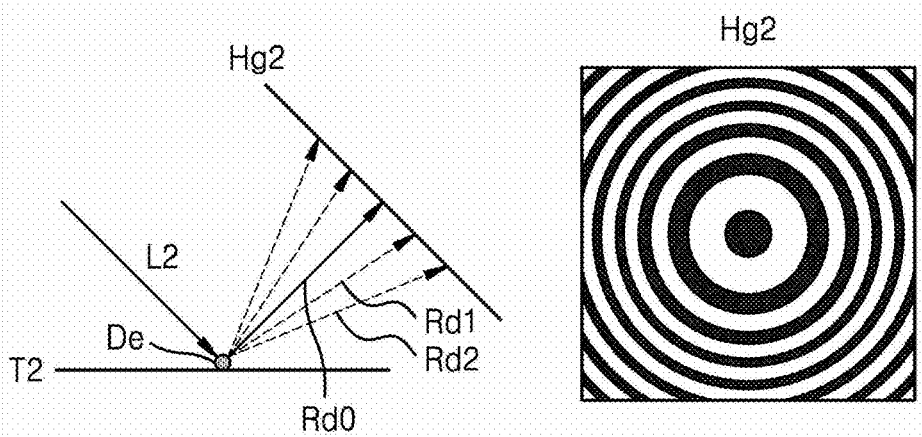

FIG. 1A is a block diagram of coherent diffraction imaging (CDI) based inspection apparatus according to an embodiment of the inventive concept, FIG. 1B is a conceptual diagram of the CDI based inspection apparatus according to an example embodiment of the inventive concept, and FIGS. 2A and 2B are conceptual diagrams for describing concept of CDI technique.

Referring to FIGS. 1A, 1B, 2A and 2B, the CDI based inspection apparatus 1000 (hereinafter, simply referred to as an "inspection apparatus") of this embodiment may inspect an inspection target by using the CDI technique. Herein, the CDI technique may refer to technique for optically calculating an image of an object by analyzing diffraction interference signals of light scattered by a sample that is an inspection target. Unlike a related art optical system that produces the image of the object at a focal length by using a lens or a mirror, the CDI technique may allow a sensor to directly record optical field signals in a travel direction of light. According to an embodiment, the CDI technique may be applied to a coherent scattering microscope (CSM) equipment, which is an inspector of an extreme ultraviolet (EUV) phase shift mask (PSM) using an EUV light source. However, the application of the inspection apparatus 1000 of the example embodiment is not limited to the EUV light source or the equipment using the EUV light source. For example, the inspection apparatus 1000 of the example embodiment is not limited to the specific light source or equipment, but may be applied to the light source of various wavelengths and the equipment using such the light source.

According to an example embodiment, the inspection apparatus 1000 may include a light source 100, an irradiation optical system 200, a stage 300, a detector 400, a detector moving device 500, and an image processing device 600.

The light source 100 may generate light (L) of a required wavelength and input the light to the irradiation optical system 200. The light source 100 may be a coherent light source that generates and outputs coherent light. The coherent light may refer to light that causes interference, such as constructive interference or destructive interference, due to phase differences when two or more lights overlap. For example, the light source 100 may be a discontinuous spectral light source and may be a monochromatic point source.

In the inspection apparatus 1000 of the example embodiment, the light source 100 may generate and output laser. The laser may be a monochromatic light that is spatially and temporally high coherent. In addition, the light source 100 may generate and output EUV or EUV laser. The light source 100 may generate and output EUV through mechanisms such as laser-produced plasma (LPP), discharged-produced plasma (DPP), high-order harmonic generation (HHG). However, in the inspection apparatus 1000 of the example embodiment, the light generated and output by the light source 100 is not limited to EUV. For instance, according to example embodiment, in the inspection apparatus 1000, the light generated by the light source 100 may be light having a relatively short wavelength such as EUV or soft X-ray.

The irradiation optical system 200 may irradiate the light from the light source 100 on to an inspection target 2000 by using a plurality of optical elements. In the inspection apparatus 1000 of the example embodiment, the irradiation optical system 200 may include a plurality of mirrors that transmit light through reflection. Specifically, the irradiation optical system 200 may include a multi-layer concave mirror 210 and an irradiation mirror 220. In addition, in some embodiments, at least one incident relay mirror may be further arranged between the multi-layer concave mirror 210 and the irradiation mirror 220.

The multi-layer concave mirror 210 may reflect and focus incident light. The multi-layer concave mirror 210 may include, for example, an elliptic mirror or a spherical mirror. By focusing the light through the multi-layer concave mirror 210, the size of the light may be reduced to μm level and also the intensity per area of the light to be irradiated to the inspection target 2000 may be increased, and therefore, the intensity of the light reflected and diffracted by the inspection target 2000 may be increased. As a result, the detector 400 may detect the light in which the intensity thereof is increased, and therefore, it may be easier to implement phase retrieval and super resolution of the diffraction image in the image processing apparatus 600.

The multi-layer concave mirror 210 may include a multiple material layer structure, such as an EUV mask. For example, the multi-layer concave mirror 210 may include a reflective multi-layer for reflecting EUV on a substrate including low thermal expansion material (LTEM), such as quartz. For example, the reflective multi-layer may have a structure in which a molybdenum (Mo) layer and a silicon (Si) layer are alternately stacked in tens or more layers. However, the material of the reflective multi-layer is not limited to the above materials.

The irradiation mirror 220 may irradiate the focused light through the multi-layer concave mirror 210 on to the inspection target 2000 with a predetermined angle of incidence.

According to an example embodiment, the irradiation mirror 220 may include a planar mirror. Also, according to an example embodiment, the irradiation mirror 220 may have the multiple material layer structure similar to the multi-layer concave mirror 210.

On the other hand, the light to be irradiated on the inspection target 2000 may be reflected and/or diffracted by a surface of the inspection target 2000 to proceed to the detector 400. In general, light may be reflected by the inspection target 2000 with the same reflection angle as an incident angle. In addition, when light is reflected by the surface of the inspection target 2000, the light may be diffracted by a pattern or a defect on the surface of the inspection target 2000, and the diffracted light may interfere with non-diffracted light to generate interference light. The diffraction and interfering lights will be described in more detail in the description of the detector 400 below.

In FIG. 1B, the reflected light (R) reflected from the inspection target 2000 is shown to be incident directly to the detector 400, but in some embodiments, at least one radiation relay mirror may be arranged between the inspection target 2000 and the detector 400. When the radiation relay mirror is arranged between the inspection target 2000 and the detector 400, the degree of freedom of arrangement of the detector 400 may be increased based on the radiation relay mirror, and also the structure of the entire inspection apparatus 1000 may be compact. Furthermore, the adjustment on the x-y plane of the detector 400 may be performed through the movement of the radiation relay mirror. The structure of the inspection apparatus including the radiation relay mirror will be described in more detail in the description of FIG. 7C.

For reference, in the inspection apparatus 1000 of the example embodiment, when the light to be used is not short wavelength light such as EUV or soft X-ray, in some example embodiments, the irradiation optical system 200 may include a lens. In addition, FIG. 1B illustrates the structure of the inspection apparatus 1000 where the incident light is reflected and diffracted by the inspection target 2000 and the detector 400 detects the reflected and diffracted light to generate the diffraction image. However, the structure of the inspection apparatus 1000 of the example embodiment is not limited thereto. For example, the inspection apparatus 1000 of the example embodiment may have a structure where incident light is transmitted and diffracted at the inspection target 2000, and the detector 400 detects the transmitted and diffracted light to generate the diffraction image.

The stage 300 may include a movable stage 310 and a chuck 320. The movable stage 310 may move in a first direction and a second direction on a plane parallel to a top surface thereof, and in some embodiments, the movable stage 310 may also move in a third direction perpendicular to the plane.

The chuck 320 may be arranged on the movable stage 310, and the inspection target 2000 may be arranged and fixed on the chuck 320. By moving the movable stage 310, the chuck 320 and the inspection target 2000 may move in at least one of the first direction, the second direction, and the third direction. In some embodiments, the chuck 320 may be omitted, and in that case, the movable stage 310 may also function as the chuck 320. In such a case, the inspection target 2000 may be arranged and fixed directly on the movable stage 310. Here, the inspection target 2000 may be the EUV mask. However, the inspection target 2000 is not limited to the EUV mask. For example, the inspection target 2000 may include a wafer, a glass substrate, or the like.

Meanwhile, as shown in FIG. 1B, the irradiation optical system 200 and the stage 300 may be arranged in a vacuum chamber 201. In more detail, when the inspection apparatus 1000 uses the short wavelength light such as EUV for inspection, in order to generate and interpret the diffraction image of EUV, the absorption of EUV may be minimized during EUV transmission. Accordingly, the irradiation optical system 200, which may be composed of the multi-layer concave mirror 210, the irradiation mirror 220 and the like, the stage 3000 on which the irradiation optical system 200 and the inspection target 2000 are provided may be arranged in the vacuum chamber 201. For example, the vacuum chamber 201 may be a pressure of $10^{-4}$ torr or less.

The detector 400 may receive the light reflected and diffracted by the inspection target 2000 to generate the diffraction image. Here, the diffraction image may mean a hologram by, for example, diffraction interference light (hereinafter, referred to as "interference light"). The hologram may include intensity and phase information of the interference light. The detector 400 may be implemented as, for example, a charge coupled device (CCD) camera or a complementary metal-oxide semiconductor (CMOS) image sensor (CIS) camera. Meanwhile, when the light is short wavelength light such as EUV or soft X-ray, the detector 400 may be an X-ray CCD camera to be specialized for short wavelength light. The X-ray CCD camera may be, for example, a high resolution CCD camera capable of detecting short wavelength light from EUV to X-ray.

According to an example embodiment, when there is no defect or pattern in the inspection target 2000, for example, when the inspection target 2000 is a simple multi-layer planar mirror, diffraction may not occur and thus, interference light may not be generated, and therefore, the detector 400 may not generate the hologram with respect to interference light. According to an example embodiment, before performing inspection on the inspection target 2000, for example, instead of the EUV mask, a multi-layer plane mirror may be arranged on the chuck 320, and EUV may be irradiated onto the multi-layer plane mirror. Then, by detecting the reflected EUV through the detector 400, characteristics such as beam shape and output of EUV to be used for inspection may be measured, and the characteristic data with respect to such EUV may be used as reference data in the inspection of the EUV mask later.

For reference, in general, the hologram may refer to a photograph of a 3D image so that it may be seen in three dimensions as though it is a real object. The hologram may be made by using the principle of holography. The general principle of holography may be as follows. The light from the laser may be divided into two lights, and one of the two light may be directly irradiated to a screen and other light of the two lights may be reflected on an object to be viewed and irradiated to the screen. At this time, the light directly irradiated onto the screen may be referred to as reference beam, and the light reflected from the object may be referred to as object beam. Since the object beam may be light reflected from a surface of the object, the phase thereof may change according to each position of the surface of the object. Accordingly, the reference beam and the object beam may interfere with each other so that an interference fringe may be formed on the screen. An image in which such interference fringe is stored may be referred to as the hologram. A general photograph may store only the intensity of light, but the hologram may store the intensity and phase information of light.

On the other hand, rather than the concept that light is separated into reference light and object light from the beginning through a spectroscope and subsequently merged, in the inspection apparatus 1000 of the example embodiment, the light may be irradiated to the inspection target, and the hologram may be generated by interference light between the light diffracted by the inspection target, that is, a harmonic wave and a non-diffracted fundamental wave.

As shown in FIG. 2A, when a first incident light L1 is irradiated to the first target T1 and the first incident light L1 passes through the first target T1 and when there is a defect De or a pattern or the like on the first target T1, the first incident light L1 may be diffracted and separated into a fundamental wave Td0 and diffracted lights Td1 and Td2. In addition, interference may occur between the fundamental wave Td0 and the diffracted lights Td1 and Td2. Accordingly, as shown in a right side, the detector 400 may generate a first hologram Hg1 as the diffraction image. Meanwhile, in FIG. 2A, only the diffraction lights Td1 and Td2 for first and second harmonic waves are shown for convenience, but there may be more harmonic waves in reality.

As shown in FIG. 2B, when a second incident light L2 is irradiated on to the second target T2 and the second incident light L2 is reflected by the second target T2 and when there is the defect De or the pattern or the like on the second target T2, the second incident light L2 may be diffracted and reflected to be separated into a fundamental wave Rd0 and diffracted lights Rd1 and Rd2. In addition, interference may occur between the fundamental wave Rd0 and the diffracted lights Rd1 and Rd2, and as shown in the right side, the detector 400 may generate a second hologram Hg2 as the diffraction image. In FIG. 2B, only the diffracted lights Rd1 and Rd2 for the first and second harmonic waves are shown for convenience.

Referring to FIG. 1B, the detector moving device 500 may move the detector 400 in three dimensions. In other words, the detector moving device 500 may cause the detector 400 to move on a z-axis corresponding to traveling direction of the light and on the x-y plane perpendicular to the z-axis. That is, the detector 400 may move on an optical axis (z-axis), and on the x-y plane perpendicular to the z-axis. According to an example, the x-y-z coordinate system on which the detector 400 moves may be different from the 1-2-3 coordinate system illustrating the cross-sectional arrangement of the inspection apparatus 1000. The detector moving device 500 may move the detector 400 in three dimensions, so that the detector 400 may shoot the inspection target 2000 at different positions in three dimensions to generate a plurality of diffraction images. That is, the detector moving device 500 may move the detector 400 in three dimensions, so that the detector 400 may capture reflected and/or diffracted light from the inspection target 2000 at different positions in three dimensions to generate a plurality of diffraction images. In addition, in the image processing apparatus 600, phase retrieval and super resolution of the diffraction image may be implemented based on the plurality of diffraction images.

For example, the detector moving device 500 may move the detector 400 on the z-axis for phase retrieval, so that the detector 400 may generate a plurality of diffraction images at different positions from each other on the z-axis. In addition, the detector moving device 500 may move the detector 400 on the x-y plane for super resolution, so that the detector 400 may generate a plurality of diffraction images at different positions from each other on the x-y plane. Here, a region on the x-y plane may correspond to a region on the top surface of the inspection target 2000. Thus, the movement on the x-y plane of the detector 400 may correspond to the movement on the top surface of the inspection target 2000.

Meanwhile, the inspection apparatus 1000 of the example embodiment may allow the detector 400 to generate the diffraction images while simultaneously moving on the z-axis and the x-y plane through the detector movement device 500. In other words, the detector 400 initially may generate the diffraction image at a first position on the z-axis and a first region on the x-y plane. Next, the detector 400 may move through the detector moving device 500 to generate the diffraction image at a second position on the z-axis axis and a second region on the x-y plane. Then, the detector 400 may again move through the detector moving device 500 to generate the diffraction image at a third position on the z-axis axis and a third region on the x-y plane. Here, the first position, the second position, and the third position may be different positions on the z-axis. In addition, the first region, the second region, and the third region may be regions of different positions on the x-y plane. The generation of a plurality of diffraction images and implementation of phase retrieval and super resolution will be described in more detail in the description of FIGS. 3A to 5C.

The image processing apparatus 600 may reconstruct the diffraction image from the detector 400 to generate an actual image of the inspection target 2000. Here, reconstruction of the diffraction image may refer to phase retrieval and super resolution of the diffraction image. Such reconstruction of the diffraction image may be performed automatically through a reconstruction algorithm or program. For example, when information on the diffraction image, for example, the hologram, from the detector 400 is input to the image processing apparatus 600, an image for the inspection target 2000, in which phase retrieval and super resolution may be automatically implemented through a reconstruction program in the image processing apparatus 600, may be generated. The image processing apparatus 600 may include, for example, a general personal computer (PC), a workstation, a supercomputer, or the like, to perform the reconstruction program.

Meanwhile, when the multi-layer plane mirror is arranged on the stage 300 instead of the inspection target 2000, the detector 400 may not generate the diffraction image, that is, the hologram. In such a case, the image processing apparatus 600 may not generate a separate image. In some embodiments, the detector 400 may generate an image by the light reflected from the multi-layer plane mirror, and the image processing apparatus 600 may output the image as captured by the detector 400.

According to an example embodiment, the inspection apparatus 1000 may further include an analysis determination apparatus, and the analysis determination apparatus may determine whether there is a defect, or the inspection target 2000 is normal, by analyzing the image of the inspection target 2000 from the image processing apparatus 600. In addition, the analysis determination device may measure a critical dimension (CD) or the like of the pattern of the inspection target 2000. The analysis determining apparatus may include, for example, the general PC, the workstation, the supercomputer, or the like for performing an analysis and determination program. In some embodiments, the analysis determining apparatus may be implemented as one computer apparatus together with the image processing apparatus 600.

In the inspection apparatus 1000 of the example embodiment, the detector 400 may move through the detector moving device 500 simultaneously on the z-axis and the x-y plane to generate the diffraction image, whereby the detector 400 may generate a minimum of a plurality of diffraction images that are different from each other on the z-axis and the x-y plane. In addition, the image processing apparatus 600 may quickly perform the implementation of phase retrieval and super resolution by using the reconstruction program based on the minimum of the plurality of diffraction images. As a result, the inspection apparatus 1000 of the example embodiment may reduce the shooting (or capturing) time required by the detector 400 in hardware (H/W), and also may reduce execution time of the implementation of phase retrieval and super resolution in the image processing apparatus 600 in software (S/W).

Figure 3C:
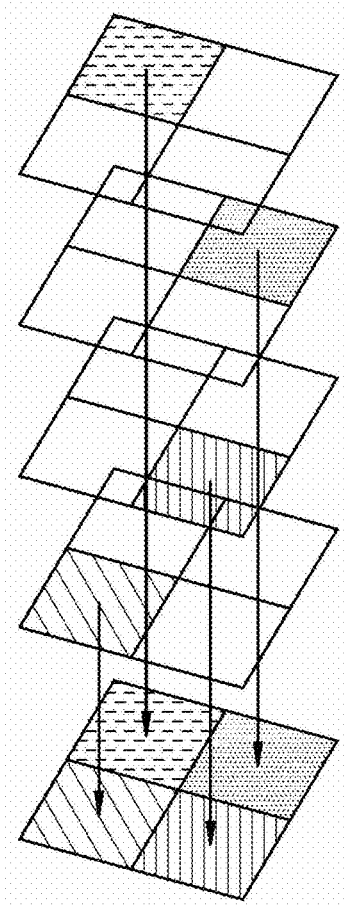
Figure 5A:
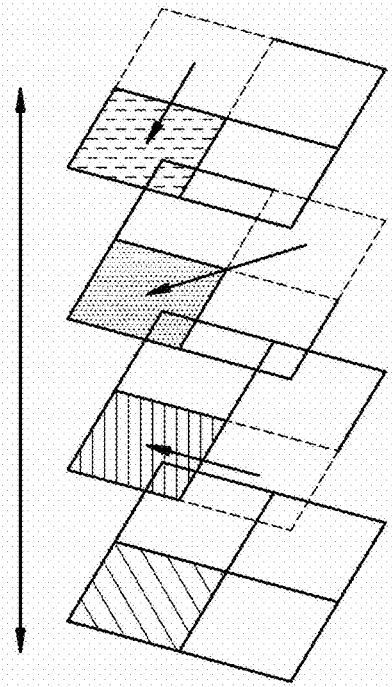
FIGS. 5A and 5B are conceptual diagrams for describing a method of phase retrieval of FIG. 3B.
Figure 5B:
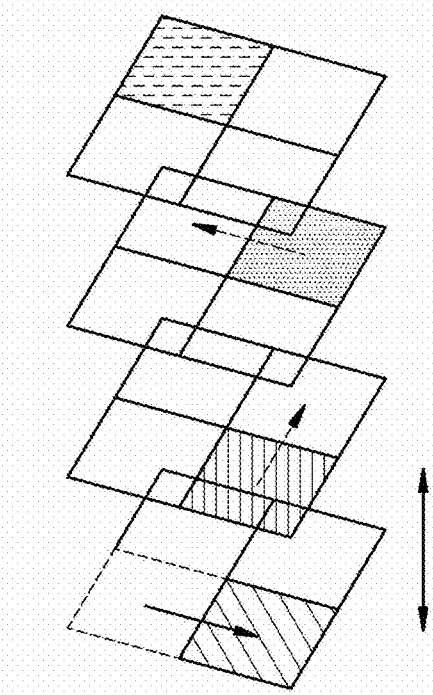

FIGS. 3A to 3C are conceptual diagrams schematically illustrating a method of simultaneously implementing phase retrieval and super resolution of the diffraction image through the inspection apparatus of FIG. 1A or 1B. FIGS. 4A and 4B are conceptual diagrams for explaining the concept of the movement of the detector on the x-y plane for implementing super resolution. FIGS. 5A and 5B are conceptual diagrams for explaining the method of the phase retrieval of FIG. 3B. A description will be given with reference to FIG. 1B, and the contents already described with reference to FIGS. 1A to 2B will be simply described or omitted.

Referring to FIG. 3A, the detector 400 may be moved in three dimensions through the detector moving device 500 and may shoot the inspection target 2000 to generate the plurality of diffraction images. That is, the detector 400 may be moved in three dimensions through the detector moving device 500 and may capture the light reflected and/or diffracted by the inspection target 2000 to generate the plurality of diffraction images. Here, when the optical axis of the light incident on the detector 400 is the z-axis, the three dimensional movement may mean the movement on the z-axis and the x-y plane perpendicular to the z-axis. In FIG. 3A, a source may correspond to, for example, the light source 100, and a target may correspond to, for example, the inspection target 2000. In addition, multi-layer moving image shooting may correspond to shooting (or capturing) and generation of the diffraction image by the three dimensional movement of the detector 400.

The purpose of generating a plurality of diffraction images while the detector 400 moves along the position on the z-axis may be for phase retrieval of the diffraction images, and the purpose of generating diffraction images while the detector 400 moves along the region on the x-y plane may be for implementing super resolution of the diffraction images. As described above, the intensity and phase information may be included in the diffraction image, for example, the hologram.

Generally, in a detector such as CCD, shooting a small region a single pixel may directly determine the limit of resolution. Therefore, if an image beyond the limit of resolution in a pixel unit may be required, the introduction of super resolution technique may be essential. In order to overcome the limit of resolution of signal due to the pixel size of the detector, the inspection apparatus 1000 according to the example embodiment may use pixel super resolution (PSR) technique, in which the inspection apparatus 1000 may shoot several pictures while moving the detector or the light source by a distance smaller than the width of one pixel in the horizontal direction to increase the resolution of one pixel, as the super resolution technique. When using the PSR technique, $n^2$ or more image may be shot or captured, and thus $n^2$ or more diffraction images may be required to improve the resolution n times.

On the other hand, horizontal movement interval of the detector or the light source should be smaller than the pixel width, so the interval should not be an integer multiple of the pixel width. If the magnification of the resolution to be improved is n times, the movement interval of (the pixel width)/n may be the most effective horizontal movement. In more detail, when 2 times magnified image with the same resolution is required to be generated, that is, when the resolution is to be increased 2 times, as shown in FIG. 4A, it may be the most effective to obtain four diffraction images while moving at interval of a half of one pixel width Pw, that is, Pw/2. On the other hand, if the detector or the light source is moved 2 or more times at the Pw/2 interval in one direction, it is out of a first region xy0 and may not be used in the PSR technique. Therefore, after shooting is first performed at the first region xy0, the shooting may be performed next at a second region xy1 after moving in the x-axis direction, thereafter at a third region xy2 after moving in the y-axis direction, and finally at a fourth region xy3 after moving in the (−)x-axis direction in this order. In this way, four diffraction images may be generated by the horizontal movement.

On the other hand, in the inspection apparatus 1000 of the example embodiment, the horizontal movement of the detector or the light source is not limited to linear movement. For example, the horizontal movement of the detector or the light source may be implemented by curve movement through rotation or the like.

FIG. 4B shows the horizontal movement for a region containing nine pixels, and a method of the horizontal movement of this example embodiment may be substantially the same as the method regarding a case of one pixel. For example, in order to improve the resolution 2 times, it may need to generate the four diffraction images by shooting while moving the detector 400 by ½ of the pixel width.

In the inspection apparatus 1000 of the example embodiment, the horizontal movement may be limited to the movement of only the detector 400. In other words, in the inspection apparatus 1000 of the example embodiment, the horizontal movement of the light source 100 may not be performed. This may be because the movement of the light source 100 in the horizontal direction may be difficult to be precisely controlled due to the presence of the multi-layer concave mirror 210 or the like of the irradiation optical system 200.

On the other hand, for the phase retrieval of the diffraction image, various information about the traveling direction of light may be required. For example, for the phase retrieval, the detector may perform m (m≥2) shootings and correspondingly, may generate m diffraction images while moving the position thereof in a direction perpendicular to a surface of the detector 400, that is, in the optical axis direction of the light to be irradiated on the detector 400, and then the detector 400 may use the generated m diffraction images for the phase retrieval. According to an example embodiment, the detector 400 may perform 4 to 8 vertical shootings may be required.

In the inspection apparatus 1000 of the example embodiment, as illustrated in FIG. 3A, the detector 400 may generate the plurality of diffraction images while simultaneously moving on the z-axis and the x-y plane. For instance, when four shootings (z0, z1, z2 and z3) are performed on the z-axis for the phase retrieval and four shootings (xy0, xy1, xy2 and xy3) are performed in four regions on the x-y plane for improving the resolution 2 times, the detector 400 may generate a first diffraction image A0 by shooting the inspection target 2000 in a first position z0 on the z-axis and in a first region xy0 on the x-y plane. Next, the detector 400 may move to a second position z1 on the z-axis and a second region xy1 on the x-y plane through the detector movement device 500 and may generate a second diffraction image A1 by shooting the inspection target 2000 there. Subsequently, the detector 400 may generate a third diffraction image A2 in a third position z2 on the z-axis and a third region xy2 on the x-y plane, and may generate a fourth diffraction image A3 in a fourth position z3 on the z-axis and a fourth region xy3 on the x-y plane. Here, the first to fourth positions z0 to z3 may be different positions on the z-axis, and the first to fourth regions xy0 to xy3 may be regions of different positions on the x-y plane. That is, the position and/or the order of the shooting is not limited to the illustration in FIG. 3A.

In FIG. 3A, the generation of the diffraction image may be proceeded in one region on the x-y plane corresponding to one position on the z-axis, but a method of the generation of the diffraction image is not limited thereto. For example, the diffraction image may be generated in a plurality of regions on the x-y plane corresponding to one position on the z axis. Here, the plurality of regions on the x-y plane may be regions at different positions.

According to a more generalization of the method of simultaneous movement on the z-axis and the x-y plane and thus the generation of a plurality of diffraction images, when the diffraction image is generated in m (m is an integer of 2 or more) different positions on the z-axis for phase retrieval and in $n^2$ different regions on the x-y plane to improve the resolution n (n is an integer of 2 or more) times and when m is equal to $n^2$, the diffraction image may be generated in one region on the x-y plane corresponding to each position on the z-axis.

On the other hand, when m is smaller than $n^2$, the diffraction image may be generated in one or more regions on the x-y plane corresponding to each position on the z-axis. For example, considering a case where m is 4 and n is 3, the diffraction images may be generated in the first and third regions xy0 and xy2 on the x-y plane corresponding to the first position z0 on the z-axis, may be generated in the fourth and sixth regions xy3 and xy5 on the x-y plane corresponding to the second position z1 on the z-axis, may be generated in a seventh and ninth regions xy6 and xy8 on the x-y plane corresponding to the third position z2 on the z-axis, and may be generated in the second, fifth, and eighth regions xy1, xy4 and xy7 on the x-y plane corresponding to the fourth position z3 on the z-axis.

In addition, when m is greater than $n^2$, the diffraction image may be generated in one or more position on the z-axis corresponding to one region on the x-y plane.

Meanwhile, FIG. 3A illustrates that when each of the first region to the fourth region xy0 to xy3 corresponds to one pixel, the movement on the x-y plane may be performed to be moved by one pixel width. However, this is for convenience of illustration, the movement on the x-y plane may be made by ½ of the pixel width as shown in FIG. 4A. In addition, in an operation of generating the plurality of diffraction images, when the diffraction image is generated, the position on the z-axis or the difference in relative height, and the position of regions or the relative position difference on the x-y plane may be estimated by an image processing method, or may be obtained by directly measuring through a precise hardware H/W encoder or the like. In the inspection apparatus 1000 of the example embodiment, for example, position information on the z-axis and the x-y plane of the diffraction image may be obtained by the hardware encoder. However, the obtaining of position information on the z-axis and the x-y plane is not limited thereto. For example, in the inspection apparatus 1000 of the example embodiment, the position on the z-axis may be calculated by an auto-focus method using a sobel edge detection method, or the position on the x-y plane may be calculated through cross correlation between images.

Referring to FIG. 3B, after obtaining the plurality of diffraction images different from each other on the z-axis and the x-y plane through the movement of the detector 400, the phase retrieval of the diffraction images may be performed. For example, the phase information of each diffraction image may be restored by using a multi-image-based phase retrieval algorithm based on previously obtained position information on the z-axis. In the inspection apparatus 1000 of the example embodiment, Gerchberg-Saxton algorithm may be used as the image-based phase retrieval algorithm. However, the image-based phase retrieval algorithm to be used in the inspection apparatus 1000 of the example embodiment is not limited to the Gerchberg-Saxton algorithm. For example, the inspection apparatus 1000 of the example embodiment may use any known image-based phase retrieval algorithms.

According to an example embodiment, the phase retrieval of the diffraction image, as shown in FIG. 5A, may be performed by registering the diffraction images on Fourier domain with cross-correlation so that they are aligned in line on the z-axis, and then converging the phases through optical field propagation iteration, and shifting them to their original positions. According to another example embodiment, as shown in FIG. 5B, the phase retrieval of the diffraction image may be performed by shifting the diffraction image to the corresponding position on the x-y plane of an adjacent diffraction image to have aligned position along the z-axis for each propagation iteration, thereby converging the phases by performing the propagation iteration. In the inspection apparatus 1000 according to the example embodiment, the phase retrieval of the diffraction image may be performed in such a manner as to register the diffraction images and then converge the phases by performing the propagation iteration, in which the manner may be more advantageously at a calculation speed. However, the method of performing phase retrieval is not limited thereto. For example, the phase retrieval of the diffraction image may be performed in such a manner as to converge the phase by performing the propagation iteration while shifting the diffraction image at each propagation iteration.

According to an example embodiment, the condition of convergence may be typically set such that the difference in an estimate of the phase between the propagation iterations is equal to or less than a predetermined value ε. However, the condition of convergence is not limited thereto and may be variously changed. For example, in a case of the Gerchberg-Saxton algorithm, various minimization techniques for convergence may be utilized. In addition, in the convergence of the phase through a method of the iteration, the intensity of diffraction images recorded in each plane may serve as a constraint for phase retrieval to converge complex phases. For example, the lowermost Ai of FIG. 3B may denote an optical field of the diffracted image in which the phase retrieval is performed, and the optical field Ai of the diffracted image may include an amplitude portion represented by an absolute value and a phase portion represented by an exponential function having an imaginary number as an exponent.

At this time, if there is movement of less than one pixel when recording the intensity of the diffraction image on the x-y plane, the high frequency signal aliased to the low frequency signal may be decomposed with a difference according to the position by the principle of PSR. According to an example embodiment, this aliased high frequency signal may also be approximated to the phase information obtained through the convergence or other phase retrieval methods. Here, an aliasing may refer to a phenomenon in which an output is distorted due to overlap of adjacent spectra, when a sampling frequency is lower than twice the maximum frequency of the signal in sampling.

Referring to FIG. 3C, based on the phase information of each diffraction image restored in the phase retrieval operation of FIG. 3B and the position information on the z-axis previously obtained, wavefront propagation calculation may be performed on one x-y plane, that is, the x-y plane having the same z-axis value, with respect to all the diffraction images of each position on the z-axis. In the course of the previous iteration, in case of registering on the z-axis through pre-integrated translation, the wavefront propagation may be performed after shifting the diffraction images to the original position on the x-y plane and restoring them. If the phase convergence is performed through each movement without performing the pre-integrated translation, wavefront propagation may be performed without any separate post-recovery.

After calculating the information of the optical field on the same x-y plane from all the diffraction images of each position on the z-axis through the wavefront propagation, a pixel synthesis of the super resolution may be performed by using the calculated wavefront value and the position information on the x-y plane previously obtained. In the inspection apparatus 1000 of the example embodiment, the pixel synthesis of the super resolution may use a nearest-neighbor pixel grid allocation method. However, a method of the pixel synthesis of the super resolution is not limited thereto. For example, the inspection apparatus 1000 of the example embodiment may perform the pixel synthesis of the super resolution by using various known other algorithms.

FIGS. 6A to 6D are photographs showing the effect of implementing the phase retrieval and the super resolution.

Figure 6A:
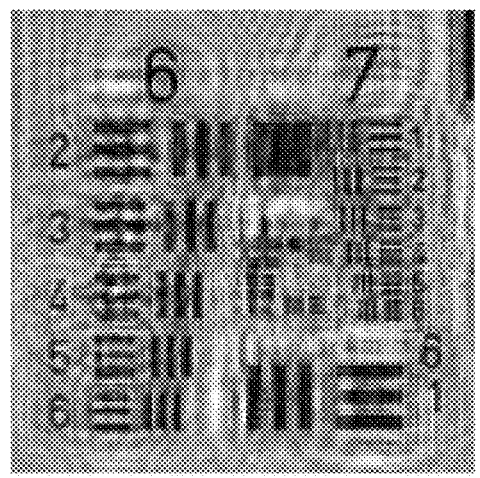
FIGS. 6A to 6D are photographs showing the effect of implementing phase retrieval and super resolution.

Referring to FIGS. 6A to 6D, a photograph of FIG. 6A is a diffraction image generated by only one shot, and thus, the phase retrieval and the super resolution are not implemented. Therefore, since there is a lot of noise in the background and the resolution is not high, it may be shown that fine line widths are not distinguished.

Figure 6B:
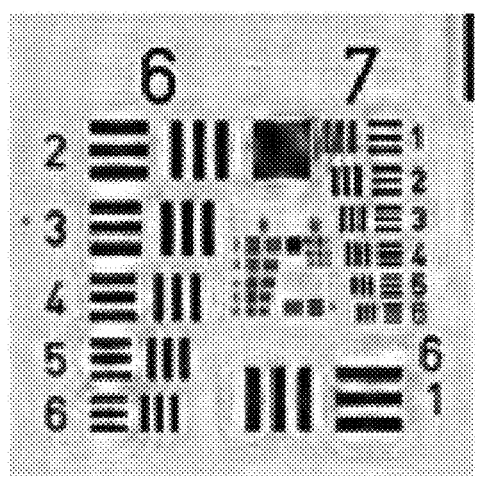

The photograph of FIG. 6B shows a case where noise is removed by restoring the phase based on four diffraction images generated by moving and shooting along only the position of the z-axis. Here, the phase may be restored but the resolution is not improved because there is no movement information on the x-y plane. In the photograph of FIG. 6B, the noise is almost removed in the background, but the resolution is not high, so it may be seen that the fine line widths are still not distinguished.

Figure 6C:
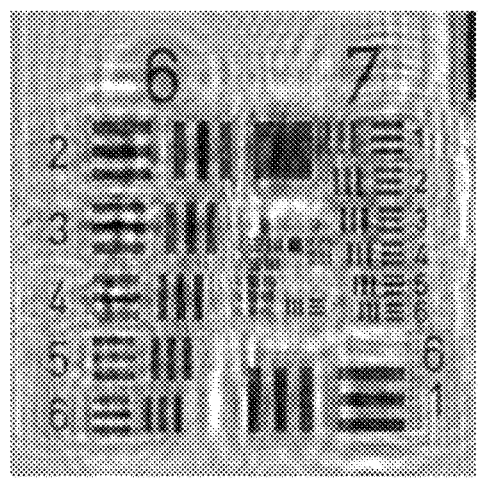

The photograph of FIG. 6C shows a case where the resolution is implemented through PSR calculation based on four diffraction images generated by moving only on the x-y plane to increase the resolution twice. Here, the resolution may be increased but phase retrieval is not performed because there is no movement information on the z-axis. In the photograph of FIG. 6C, fine line widths may be distinguished by increasing resolution, but it may be seen that background noise still remains because the phase retrieval is not performed.

Figure 6D:
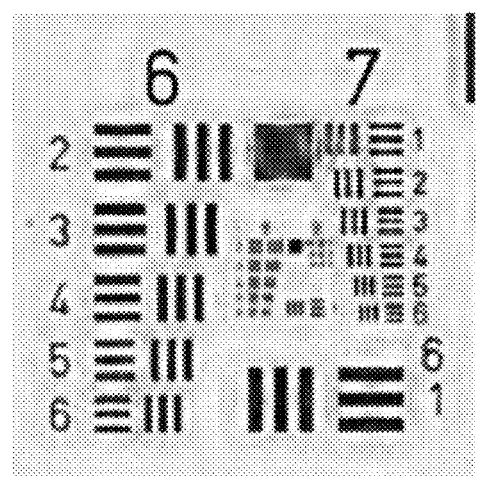

The photograph of FIG. 6D shows a case where the phase retrieval and the super resolution are simultaneously implemented based on four diffraction images generated by moving and shooting on the z-axis and the x-y plane by the inspection apparatus 1000 of the example embodiment. As may be seen in FIG. 6D, it may be seen that the phase is restored to completely remove the background noise, and the resolution is improved to ensure that the fine line widths are clearly distinguished.

According to an example embodiment, it may be considered to perform all the movements on the x-y plane to improve the resolution at each position on the z-axis. In such a case, since all of the diffraction images of a single x-y plane may be processed for super resolution image synthesis and the phase retrieval may also be performed by using the position information on the z-axis of the diffraction images on each x-y plane subjected to such super resolution, the computational efficiency may be greatly reduced. In the case of generating diffraction images in m positions on the z-axis for phase retrieval and $n^2$ regions on the x-y plane for improving the resolution of n times, comparing numerically the method of simultaneously implementing the phase retrieval and the super resolution through the inspection apparatus 1000 of the example embodiment and the above-described method, the time taken for shooting may be reduced by 1/m times, and the execution time for the phase retrieval and resolution improvement may be shortened by $1/n^2$ times.

Figure 7A:
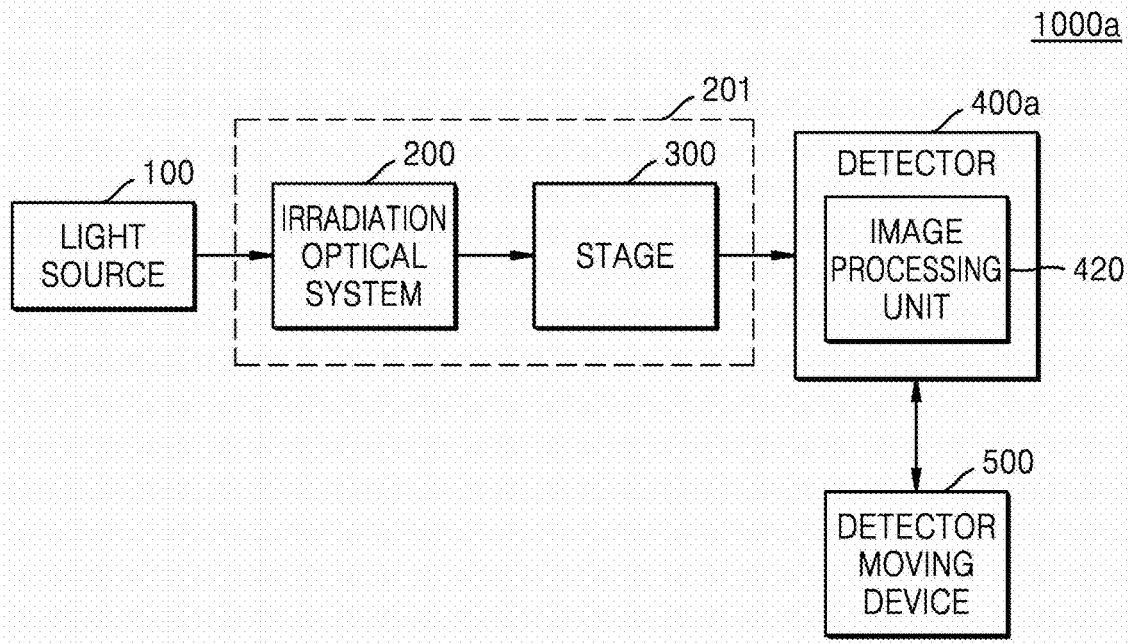
FIG. 7A is a block diagram of a CDI based inspection apparatus according to example embodiments of the inventive concept.
Figure 7B:
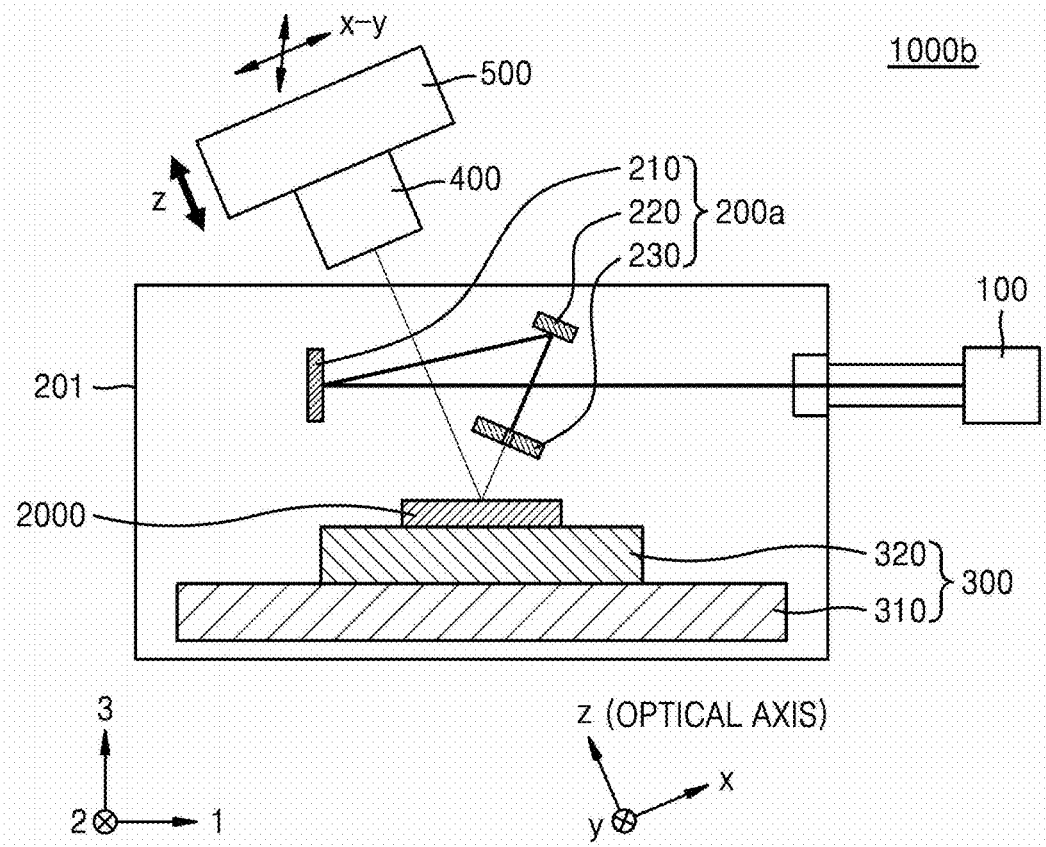
FIGS. 7B to 7D are conceptual diagrams of a CDI based inspection apparatus according to example embodiments of the inventive concept.
Figure 7C:
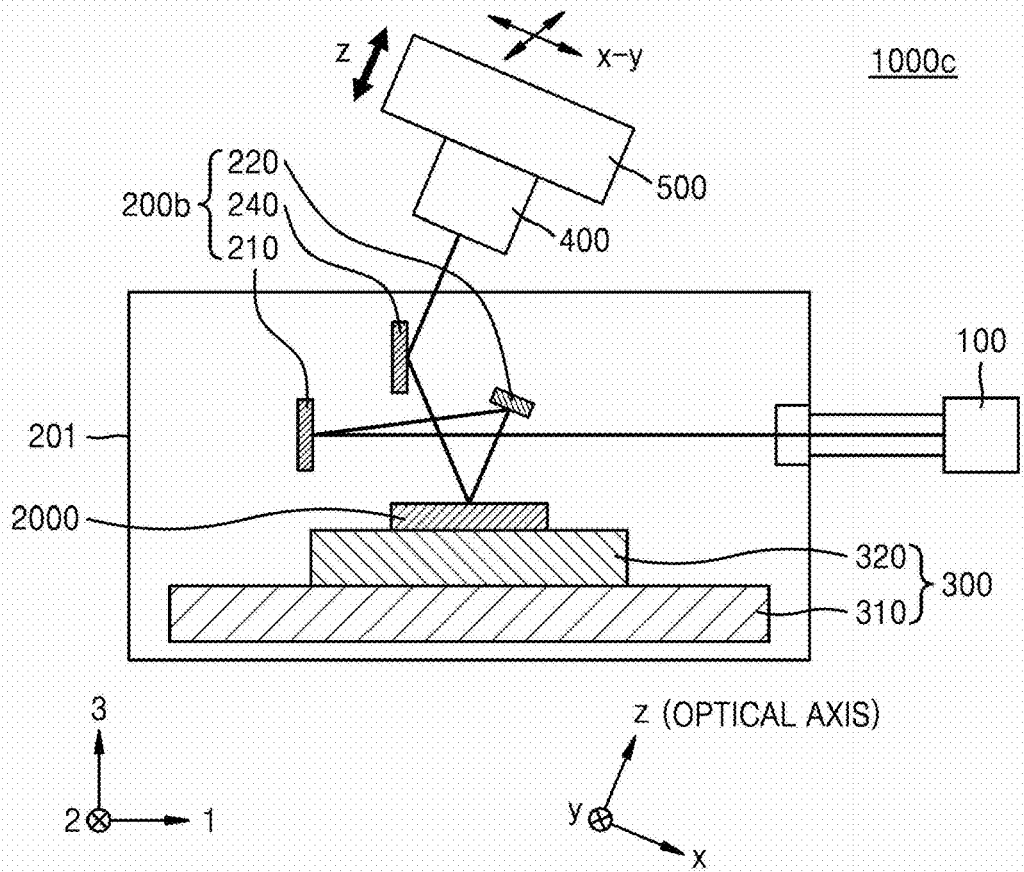
Figure 7D:
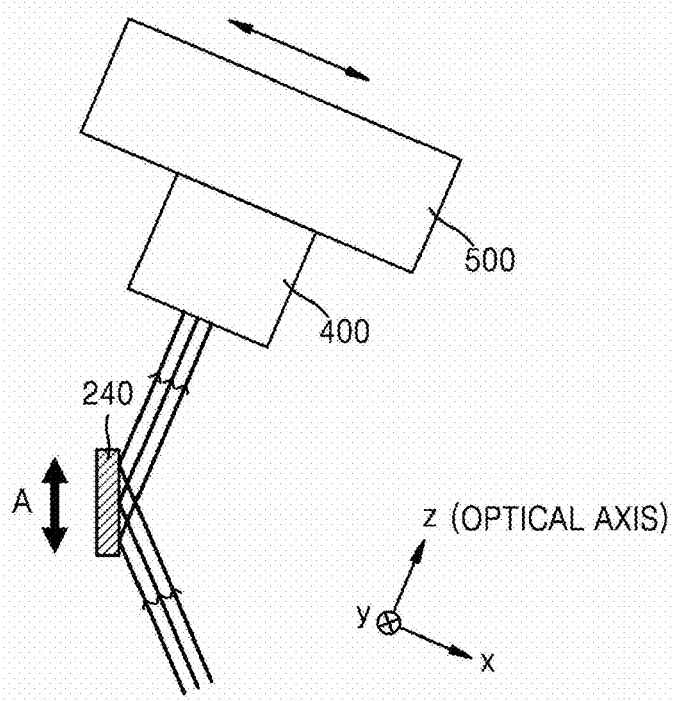

FIG. 7A is a block diagram of a CDI based inspection apparatus according to example embodiments of the inventive concept and FIGS. 7B to 7D are conceptual diagrams of a CDI based inspection apparatus according to example embodiments of the inventive concept. Also, FIG. 7D illustrates a method of implementing the movement of a detector on an x-y plane by using a radiation relay mirror in the inspection apparatus of FIG. 7C. Descriptions already described in the description of FIGS. 1A to 5B may be simply described or omitted.

Referring to FIG. 7A, the inspection apparatus 1000a of the example embodiment may be different from the inspection apparatus 1000 of FIG. 1A in that the detector 400a may include the image processing unit 420. That is, the inspection apparatus 1000a of the example embodiment may not include a separate image processing apparatus, and the detector 400a may include the image processing unit 420. In other words, the detector 400a may perform the implementation of the phase retrieval and the super resolution of the diffraction image through the image processing unit 420. In addition, in some embodiments, the detector 400a of the inspection apparatus 1000a of the example embodiment may further include an analysis determination unit. For example, the detector 400a may be implemented as a hardware device in which a CCD camera, the image processing unit 420, and/or the analysis determination unit are embedded together.

Referring to FIG. 7B, the inspection apparatus 1000b according to the example embodiment may be different from the inspection apparatus 1000 of FIG. 1B in that an irradiation optical system 200a may further include a pin-hole plate 230. For example, in the inspection apparatus 1000b of the example embodiment, the irradiation optical system 200a may include the pin-hole plate 230 arranged between the irradiation mirror 220 and the inspection target 2000, and the size of light to be irradiated to the inspection target 2000 may be adjusted by using the pin-hole plate 230. In other words, the light reflected from the irradiation mirror 220 may be reduced in size as it passes through pin-holes of the pin-hole plate 230 and then is incident on the inspection target 2000, and therefore, the size of the light on the surface of the inspection target 2000 may be reduced. Although, in the inspection apparatus 1000b of the example embodiment, the pin-hole plate 230 may be arranged between the irradiation mirror 220 and the inspection target 2000, the position of the pin-hole plate 230 is not limited thereto. For example, the pin-hole plate 230 may be arranged at any position in the irradiation optical system 200a in order to adjust the size of the light on the surface of the inspection target 2000.

Referring to FIGS. 7C and 7D, the inspection apparatus 1000c of the example embodiment may be different from the inspection apparatus 1000 of FIG. 1B in that an irradiation optical system 200b may further include a radiation relay mirror 240. For example, in the inspection apparatus 1000c of the example embodiment, the irradiation optical system 200b may include the radiation relay mirror 240 arranged between the inspection target 2000 and the detector 400, and the light reflected and diffracted at the inspection target 2000 may be irradiated to the detector 400 by using the radiation relay mirror 240.

The inspection apparatus 1000c according to the example embodiment may include the radiation relay mirror 240, thereby increasing the degree of freedom in arrangement of the detector 400 based on the radiation relay mirror 240. In addition, by freely adjusting the position of arrangement of the detector 400 by using the radiation relay mirror 240, a structure of the entire inspection apparatus 1000c may be compact. Furthermore, the movement on the x-y plane of the detector 400 may be performed through the movement of the radiation relay mirror 240.

According to an example embodiment, as shown in FIG. 7D, when the optical axis of the light to be irradiated on the detector 400 is referred to the z-axis, the movement of the detector 400 on the x-y plane perpendicular to the z-axis may be implemented through the movement of the radiation relay mirror 240. In other words, moving the radiation relay mirror 240 in the direction indicated by a thick arrow (A) may have the same effect as moving the detector 400 on the x-y plane through the detector moving device 500 as indicated by thin arrows.

Figure 8A:
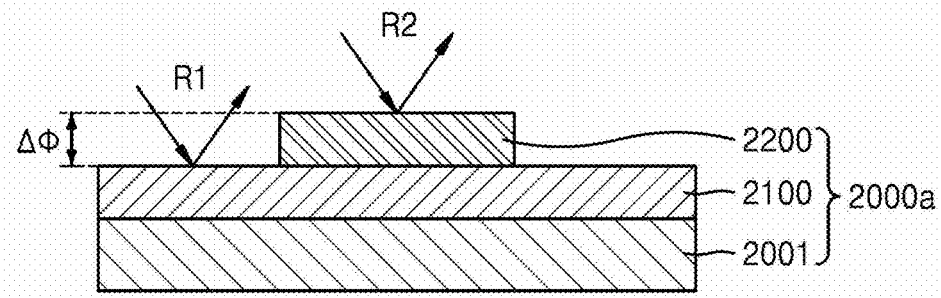
FIGS. 8A to 8C are cross-sectional views of EUV phase shift masks (PSMs)
Figure 8B:
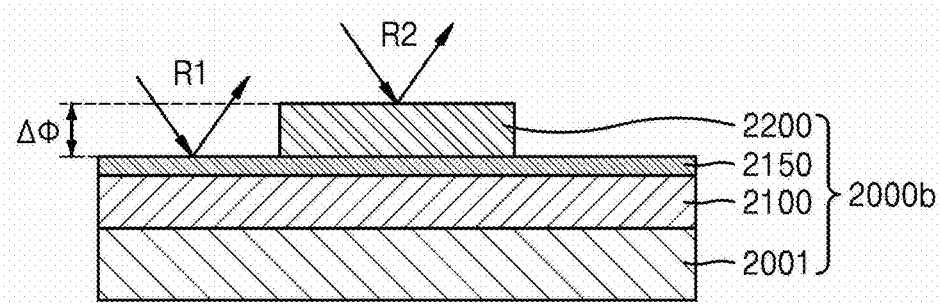
Figure 8C:
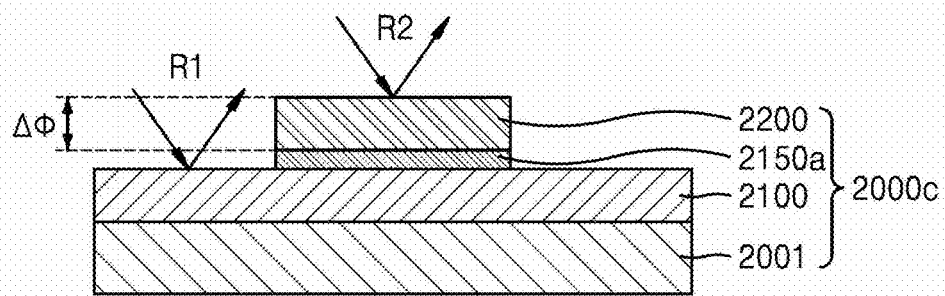

FIGS. 8A to 8C are cross-sectional views of EUV phase shift masks (PSMs).

Referring to FIGS. 8A to 8C, due to the property of EUV to be absorbed in most materials, a mask may be manufactured by a reflective optical system in an EUV lithography process. An EUV mask may be classified into a binary mask and a phase shift mask (PSM). In the case of the binary mask, a reflecting part may be made as a multi-layer structure. The reflectance is currently almost saturated, and sharpness is very low due to diffraction occurring between the patterns. On the other hand, in the case of the PSM, the phase difference that occurs may cause constructive/destructive interference, thereby improving the sharpness. Therefore, there may be a need to replace the binary mask with the PSM for more efficient and detailed EUV lithography process.

According to an example embodiment, the PSM may be manufactured in various forms. For example, in the case of the PSM 2000a of FIG. 8A, the PSM may be a structure in which a first multi-layer 2100 and a second multi-layer 2200 are formed on the substrate 2001. According to a thickness of the second multi-layer 2200, a phase difference Δφ may occur between light R1 reflected by the first multi-layer 2100 and light R2 reflected by the second multi-layer 2200. Herein, the substrate 2001 may include a low thermal expansion material such as quartz, and the first multi-layer 2100 and the second multi-layer 2200 may have a reflective multi-layer structure that several tens of molybdenum layers and silicon layers are alternately stacked.

The PSM 2000b of FIG. 8B may differ from the PSM 2000a of FIG. 8A in that an etching stop layer (ESL) 2150 may be further arranged on the entire surface of the first multi-layer 2100. As such, by forming the etching stop layer 2150, the reflection efficiency and the phase difference Δφ in the first multi-layer 2100 may be changed.

The PSM 2000c of FIG. 8C may be similar to the PSM 2000b of FIG. 8B, but it may be different from the PSM 2000b of FIG. 8B in that an etching stop layer 2150a may be formed only on a bottom surface of the second multi-layer 2200. By changing shape of the etching stop layer 2150a, the reflection efficiency and the phase difference Δφ in the first multi-layer 2100 may be changed.

However, even if the EUV PSM having a predetermined phase difference may be designed through the calculation, as shown in FIGS. 8A to 8C, since the shape of the PSM may be various and also the difference between the calculation and the actuality may occur at the time of manufacturing, it may be necessary to measure the phase difference to be actually obtained by the EUV light used for the EUV lithography process.

In the case of the inspection apparatuses 1000, and 1000a to 1000c of the example embodiments, the plurality of diffraction images with respect to the EUV mask may be generated through simultaneous movement on the z-axis and the x-y plane of the detector 400, and then the phase retrieval and the super resolution for the diffraction images may be implemented at the same time. Accordingly, the inspection devices 1000, 1000a to 1000c of the example embodiments may be applied not only to structural evaluation such as CD measurement of the EUV mask, but also to application such as detection of defects in the EUV mask or measurement of CD, etc. In addition, before the PSM is introduced into the actual lithography process, the phase difference occurring in the PSM may be calculated to determine whether the PSM is normal, thereby responding to process risk.

FIG. 9 is a flowchart schematically illustrating a CDI based inspection method according to an embodiment of the inventive concept. Description will be given with reference to FIGS. 1B, and 3A to 3B together, and descriptions already described in the description of FIGS. 1A to 8C will be briefly described or omitted.

Referring to FIG. 9, the CDI based inspection method of the example embodiment (hereinafter simply referred to as an 'inspection method') first may obtain a plurality of diffraction images with respect to the inspection target 2000 in the detector 400 (S110). The operation S110 of obtaining the plurality of diffraction images may be performed by generating the plurality of diffraction images by shooting while moving the detector 400 on the z-axis and the x-y plane simultaneously through the detector moving device 500, which may correspond to the process of FIG. 3A above. On the other hand, in the inspection method of the example embodiment, the light to be used may be EUV, the inspection target 2000 may be the EUV mask, and the irradiation optical system 200 may include the multi-layer concave mirror 210 and the irradiation mirror 220 to transfer the EUV. Of course, the type of light, the type of inspection target 2000, and the configuration of the irradiation optical system 200 are not limited to the above. The operation S110 of obtaining the plurality of diffraction images will be described in more detail in the description of FIG. 10A.

Next, the phase retrieval of the diffraction image may be performed by using the plurality of diffraction images (S130). The operation S130 of performing the phase retrieval may be performed by using a multi-image based phase retrieval algorithm based on previously obtained position information on the z-axis, and may correspond to the process of FIG. 3B. In the inspection method of the example embodiment, Gerchberg-Saxton algorithm may be used as the image based phase retrieval algorithm. However, the image based phase retrieval algorithm to be used in the inspection method of the example embodiment is not limited to the Gerchberg-Saxton algorithm.

Thereafter, the super resolution may be implemented with respect to the phase-restored diffraction image (S150). In operation S150 of implementing the super resolution, the calculation of wavefront of propagating the diffraction images for each position on the z-axis to the x-y plane of the same position on the z-axis may be performed based on the phase information of the restored diffraction images and the position information on the z-axis, and then the pixel synthesis of the super resolution may be performed by using the calculated wavefront value on the x-y plane and the position information on the x-y plane. The operation S150 of implementing the super resolution may correspond to the process of FIG. 3C, and more details will be described in the description of FIG. 10B.

In addition, in the inspection method of the example embodiment, the order of the operation S130 of performing the phase retrieval and the operation S150 of implementing the super resolution may be changed. Further, in the inspection method of the example embodiment, the operation S130 of performing the phase retrieval and the operation S150 of implementing the super resolution may be performed simultaneously.

Figure 10A:
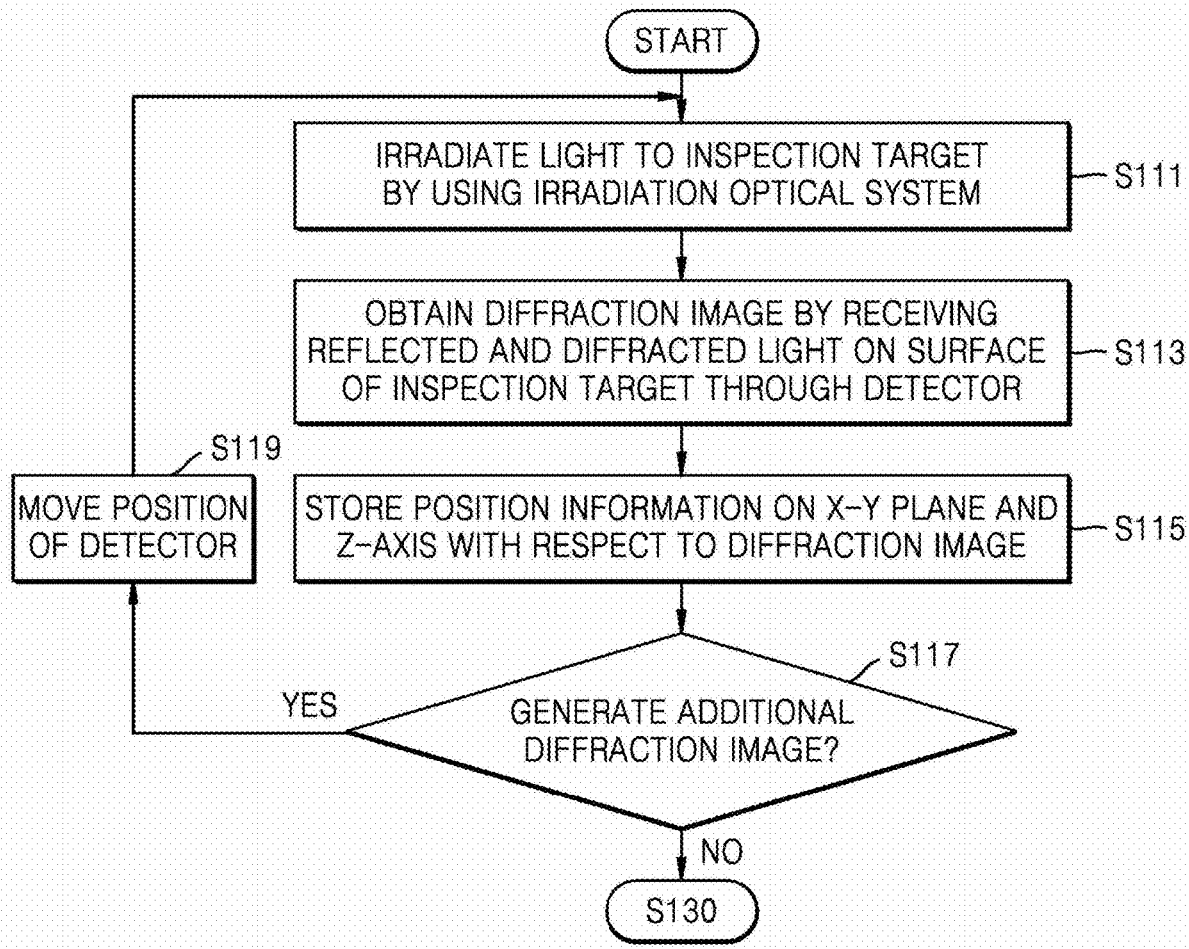
FIGS. 10A and 10B are flowcharts illustrating in detail operations of generating a plurality of diffraction images and implementing super resolution of the diffraction images in the inspection method of FIG. 9, respectively.
Figure 10B:
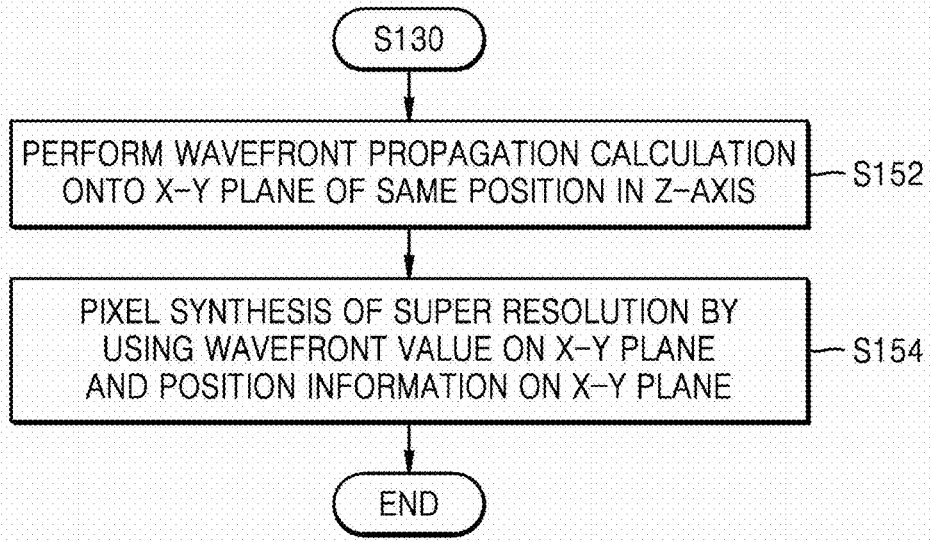

FIGS. 10A and 10B are flowcharts illustrating in detail operations of generating a plurality of diffraction images and implementing super resolution of the diffraction images in the inspection method of FIG. 9, respectively. Description will be given with reference to FIGS. 1B, and 3A to 3B together, and descriptions already described in the description of FIG. 9 will be briefly described or omitted.

Referring to FIG. 10A, the operation S110 of generating the plurality of diffraction images may first include a operation S111 of irradiating light on the inspection target 2000 by using the irradiation optical system 200. More specifically, after focusing the light from the light source 100 by using the multi-layer concave mirror 210, the light may be transmitted to the irradiation mirror 220, and then the irradiation mirror 220 may irradiate the focused light on the target 2000 with a predetermined incident angle.

Next, the light reflected and diffracted from the surface of the inspection target 2000 may be received by the detector 400 to generate the diffraction image (S113). The detector 400 may be movable on the z-axis and the x-y plane by the detector moving device 500, wherein the z-axis may correspond to the vertical direction of the detector 400, that is, the direction of the optical axis through which the reflected light travels, and the x-y plane may be a plane perpendicular to the z-axis. The generation of the diffraction image in the detector 400 may be performed at a specific position on the z-axis of the detector 400 and a specific region on the x-y plane.

Then, the position information on the x-y plane and z-axis for the diffraction image may be stored (S115). The position information on the x-y plane and z-axis may be estimated by an image processing method, or measured directly from a precise hardware encoder or the like, thereby being stored in a storage medium.

Next, it may be determined whether to additionally generate the diffraction image (S117). When additional generation of the diffraction image is performed (Yes), the position of the detector 400 may be moved (S119). The position of the detector 400 may be simultaneously moved on the z-axis and the x-y plane through the detector moving device 500. However, in some embodiments, the position of the detector 400 may be moved only on the x-y plane. After the position of the detector 400 is moved, the process may proceed to the operation S111 of irradiating the light on the inspection target 2000 and may repeat the subsequent process.

According to an example embodiment, whether to additionally generate the diffraction image may be determined according to a predetermined determination criterion, and the determination criterion may be set according to the number of different diffraction images on the z-axis required for the phase retrieval, and how many times the increase in resolution is required.

On the other hand, if no additional generation is performed (No), the operation S110 of generating the plurality of diffraction images may be completed, and the operation S130 of the phase retrieval of the diffraction image may be proceeded.

Referring to FIG. 10B, operation S150 of implementing the super resolution of the diffraction image may first include a operation S152 of performing wavefront propagation calculation onto the x-y plane of the same position on the z-axis. Specifically, based on the phase information of each diffraction image restored in operation S130 of performing the phase retrieval of the diffraction image and previously acquired position information on the z-axis, the wavefront propagation calculation may be performed on the x-y plane, that is, the x-y plane having the same z-axis value for all diffraction images for each position on the z-axis. In the process of performing the previous reiteration, if it is registered on the z-axis through the pre-integration movement, the wavefront propagation may be performed after moving and recovering to the position on the original x-y plane. If the phase convergence is performed through each movement without the pre-integration movement, wavefront propagation may be performed without a separate post-recovery operation.

Next, pixel synthesis of the super resolution may be performed by using the wavefront value on the x-y plane and the position information on the x-y plane (S154). In the inspection method of the example embodiment, a method of pixel synthesis of the super resolution may use a nearest pixel grid allocation method. However, the method of the pixel synthesis of the super resolution is not limited thereto.

FIG. 11 is a flowchart schematically illustrating a CDI based inspection method according to an embodiment of the inventive concept. A description will be given with reference to FIG. 7B, and the contents already described with reference to FIGS. 9 to 10B will be simply described or omitted.

Referring to FIG. 11, the CDI based inspection method according to the example embodiment (hereinafter simply referred to as an "inspection method") first may determine whether size adjustment of light is necessary (S101). Here, the light may be, for example, EUV. However, light is not limited to the EUV. When it is necessary to adjust the size of light (Yes), after arranging a pin-hole plate 230 in the irradiation optical system 200a, the size of light may be adjusted through pin-holes (S103). After adjusting the size of the light through the pin-holes, an operation S105 of measuring the beam shape and output of the light may be proceeded. If it is unnecessary to adjust the size of the light (No), the operation S105 of measuring the beam shape and output of the light may be proceeded directly.

Next, the operation S105 of measuring the beam shape and output of the light may be proceeded by using a multi-layer plane mirror. The multi-layer planar mirror may be arranged on the chuck 320 of the stage 300 instead of the inspection target 2000, it may be possible to measure the beam shape and output of the EUV by irradiating light, such as EUV, to the multi-layer planar mirror, and detecting the reflected EUV in the detector 400.

After the operation S105 of measuring the beam shape and output of the light, the process may proceed to the operation S110 of generating the plurality of diffraction images, and then subsequent operations S130 and S150 may be performed. The operation S110 of generating the plurality of diffraction images and subsequent operations S130 and S150 may be the same as those described in the description of FIG. 9. On the other hand, before the operation S110 of generating the plurality of diffraction images, the process of replacing the multi-layer planar mirror with the inspection target 2000 may be preceded.

In some embodiments, the operation S105 of measuring the beam shape and output of the light may be omitted. If both the operation S103 of adjusting the size of the light and the operation S105 of measuring the beam shape and output of the light are omitted, the inspection method of this embodiment may be substantially the same as the inspection method of FIG. 9.

At least one of the components, elements, modules or units (collectively "components" in this paragraph) represented by a block (i.e., detector 400, detector moving device 500 or image processing device 600) in the drawings in FIG. 1A and FIG. 7A may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

While the inventive concept has been particularly shown and described with reference to embodiments thereof, it will be understood that various changes in form and details may be made therein without departing from the spirit and scope of the following claims.

What is claimed is:

1. An inspection method comprising:
generating a plurality of diffraction images by irradiating light from a light source to an inspection target through an irradiation optical system and receiving the diffracted light from the inspection target by a detector;
implementing phase retrieval to restore phase of the diffraction images based on the plurality of the diffraction images; and
implementing super resolution with respect to the plurality of the diffraction images in which the phase is restored,
wherein the generating the plurality of the diffraction image comprises, while the detector moves on a z-axis corresponding to an optical axis of the light and an x-y plane perpendicular to the z-axis, the detector generates the plurality of diffraction images with different positions on the x-y plane and the z-axis with respect to the inspection target,
wherein the phase retrieval and the super resolution of diffraction images are implemented simultaneously,
wherein, in the generating the plurality of the diffraction image, the detector generates the plurality of diffraction images at m different positions on the z-axis for the phase retrieval, and at $n^2$ or more different regions on the x-y plane for improving resolution of n times, and
wherein m is an integer of 2 or more, and n is an integer of 2 or more.

2. The inspection method of claim 1, wherein, when generating the diffraction images in the $n^2$ different regions on the x-y plane, the $n^2$ regions comprises regions shifted by 1/n of a width of a pixel in an x-axis or a y-axis direction, on the x-y plane, for one pixel, and
wherein, in the generating the plurality of the diffraction image, when m and $n^2$ are the same, the diffraction image is generated in one region on the x-y plane corresponding to each position on the z-axis,
when m is less than $n^2$, the diffraction image is generated in one or more regions on the x-y plane corresponding to each position on the z-axis, and
when m is greater than $n^2$, the diffraction image is generated in one or more position on the z-axis corresponding to one region on the x-y plane.

3. The inspection method of claim 1, wherein, when generating the diffraction images in the $n^2$ different regions on the x-y plane, where n is 2 and m is 4, and
when a region corresponding to one pixel is referred to as a first region, the $n^2$ regions comprise the first region, a second region shifted by ½ of a width of the pixel on the x-axis direction from the first region, a third region shifted by ½ of the width of the pixel on the y-axis direction from the second region, and a fourth region shifted by ½ of the width of the pixel on the (−) x axis direction from the third region, and
wherein, in the generating the plurality of the diffraction image, a first diffraction image for the first region is generated at a first position that is a lowest height on the z-axis,
a second diffraction image for the second region is generated at a second position that is the second height,
a third diffraction image for the third region is generated at a third position that is a third height, and a fourth diffraction image for the fourth region is generated at a fourth position that is a highest height.

4. The inspection method of claim 1, wherein, in the generating the plurality of the diffraction image, position information on the x-y plane and the z-axis of each of the plurality of diffraction images are directly measured through a hardware encoder, or is estimated through an image processing method.

5. The inspection method of claim 1, wherein the phase retrieval comprises restoring phase information of each of the plurality of diffraction images using a multi-image-based phase retrieval algorithm based on position information on the z-axis, wherein the plurality of diffraction images are registered in a line on the z-axis, and convergence of phases is performed through propagation iteration, or the convergence of phases is performed while shifting adjacent images to have aligned position along the z-axis for each operation of propagation iteration.

6. The inspection method of claim 5, wherein the implementing super resolution of the diffraction image comprises performing wavefront propagation calculation onto the x-y plane of the same position in the z-axis from the diffraction images at each position on the z-axis, based on the restored phase information of the diffraction image and position information on the z-axis, and performing pixel synthesis of super resolution by using the calculated wavefront value on the x-y plane and position information on the x-y plane.

7. The inspection method of claim 1, wherein the generating the plurality of the diffraction image comprises:

irradiating the light on to the inspection target by using a multi-layer concave mirror;

generating a first diffraction image by receiving the light reflected and diffracted from the surface of the inspection target through the detector;

storing position information on the x-y plane and the z-axis with respect to the first diffraction image;

determining whether to additionally detect a second diffraction image; and when the second diffraction image is additionally detected, moving position of the detector, and wherein the second diffraction image is a diffraction interference image by interference of reference light and the diffracted light at the moved position.

8. The inspection method claim 1, further comprising at least one of:

adjusting size of the light at the surface of the inspection target by inserting a pin-hole plate in the irradiation optical system; and during an initial operation, measuring beam shape and output characteristic of the light by arranging a multi-layer plane mirror on the stage instead of the inspection target.

9. The inspection method of claim 1, wherein the light is EUV, the detector is an X-ray CCD camera, and the inspection target is an EUV PSM, wherein, in the restoring phase of the diffraction image, whether the EUV PSM is normal is determined by calculating phase difference occurring in the EUV PSM.

10. An inspection method comprising:

generating a plurality of diffraction images by irradiating light from a light source to an inspection target and receiving the diffracted light from the inspection target by a detector;

implementing phase retrieval to restore phase of the diffraction images based on the plurality of the diffraction images; and implementing super resolution with respect to the plurality of the diffraction images in which the phase is restored, wherein the generating the plurality of the diffraction image comprises, while the detector moves on a z-axis corresponding to an optical axis of the light and an x-y plane perpendicular to the z-axis, the detector generates the plurality of diffraction images at m different positions on the z-axis for the phase retrieval, and at $n^2$ or more different regions on the x-y plane for improving resolution of n times, wherein m is an integer of 2 or more, and n is an integer of 2 or more.

11. The inspection method of claim 10, wherein, when generating the diffraction images in the $n^2$ different regions on the x-y plane, the $n^2$ regions comprises regions shifted by 1/n of a width of a pixel in an x-axis or a y-axis direction, on the x-y plane, for one pixel.

12. The inspection method of claim 10, wherein, in the generating the plurality of the diffraction image, when m and $n^2$ are the same, the diffraction image is generated in one region on the x-y plane corresponding to each position on the z-axis, when m is less than $n^2$, the diffraction image is generated in one or more regions on the x-y plane corresponding to each position on the z-axis, and when m is greater than $n^2$, the diffraction image is generated in one or more position on the z-axis corresponding to one region on the x-y plane.

13. The inspection method of claim 10, wherein, in the generating the plurality of the diffraction image, position information on the x-y plane and the z-axis of each of the plurality of diffraction images are directly measured through a hardware encoder, or is estimated through an image processing method.

14. The inspection method of claim 10, wherein the phase retrieval comprises restoring phase information of each of the plurality of diffraction images using a multi-image-based phase retrieval algorithm based on position information on the z-axis, wherein the plurality of diffraction images are registered in a line on the z-axis, and convergence of phases is performed through propagation iteration, or the convergence of phases is performed while shifting adjacent images to have aligned position along the z-axis for each operation of propagation iteration.

15. The inspection method of claim 10, wherein the generating the plurality of the diffraction image comprises:

irradiating the light on to the inspection target by using a multi-layer concave mirror;

generating a first diffraction image by receiving the light reflected and diffracted from the surface of the inspection target through the detector;

storing position information on the x-y plane and the z-axis with respect to the first diffraction image;

determining whether to additionally detect a second diffraction image; and when the second diffraction image is additionally detected, moving position of the detector, and wherein the second diffraction image is a diffraction interference image by interference of reference light and the diffracted light at the moved position.

16. The inspection method claim 10, further comprising at least one of:

adjusting size of the light at the surface of the inspection target by inserting a pin-hole plate in the irradiation optical system; and during an initial operation, measuring beam shape and output characteristic of the light by arranging a multi-layer plane mirror on a stage instead of the inspection target.

17. An inspection method comprising:

adjusting size of light from a light source using a pin-hole plate;

measuring beam shape and output characteristic of the light by arranging a multi-layer plane mirror on a stage;

generating a plurality of diffraction images by irradiating light from the light source to an inspection target on the stage and receiving the diffracted light from the inspection target by a detector;

implementing phase retrieval to restore phase of the diffraction images based on the plurality of the diffraction images; and implementing super resolution with respect to the plurality of the diffraction images in which the phase is restored, wherein the generating the plurality of the diffraction image comprises, while the detector moves on a z-axis corresponding to an optical axis of the light and an x-y plane perpendicular to the z-axis, the detector generates the plurality of diffraction images with different positions on the x-y plane and the z-axis with respect to the inspection target, wherein, in the generating the plurality of the diffraction image, the detector generates the plurality of diffraction images at m different positions on the z-axis for the phase retrieval, and at $n^2$ or more different regions on the x-y plane for improving resolution of n times, and wherein m is an integer of 2 or more, and n is an integer of 2 or more.

18. The inspection method of claim 17, wherein, when generating the diffraction images in the $n^2$ different regions on the x-y plane, the $n^2$ regions comprises regions shifted by $1/n$ of a width of a pixel in an x-axis or a y-axis direction, on the x-y plane, for one pixel, and wherein, in the generating the plurality of the diffraction image, when m and $n^2$ are the same, the diffraction image is generated in one region on the x-y plane corresponding to each position on the z-axis, when m is less than $n^2$, the diffraction image is generated in one or more regions on the x-y plane corresponding to each position on the z-axis, and when m is greater than $n^2$, the diffraction image is generated in one or more position on the z-axis corresponding to one region on the x-y plane.

* * * * *